US012748546B2

(12) United States Patent
Tsuji

(10) Patent No.: US 12,748,546 B2
(45) Date of Patent: Sep. 29, 2026

(54) STORAGE DRIVE FOR MANAGING A MIGRATION OF VALID DATA

(71) Applicant: Kioxia Corporation, Tokyo (JP)

(72) Inventor: Ayako Tsuji, Yokohama (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/828,057

(22) Filed: Sep. 9, 2024

(65) Prior Publication Data

US 2025/0291510 A1 Sep. 18, 2025

(30) Foreign Application Priority Data

Mar. 15, 2024 (JP) ................................ 2024-041284

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS 5,553,307 A * 9/1996 Fujii ........................ G06F 13/28 710/24
10,180,792 B1 * 1/2019 Gaertner ............. G06F 11/1441
2020/0073586 A1 3/2020 Kurata et al.
2020/0293454 A1 9/2020 Yokoyama et al.
2020/0409559 A1 12/2020 Sharon et al.
2021/0073404 A1 * 3/2021 Sakata .................. G06F 3/0623
2022/0405253 A1 * 12/2022 Agrawal ................. G06F 3/061

FOREIGN PATENT DOCUMENTS

JP 2020035300 A 3/2020
JP 2020149078 A 9/2020
JP 2021006984 A 1/2021

* cited by examiner

*Primary Examiner* — Arpan P. Savla
*Assistant Examiner* — Jason Michael Pinga
(74) *Attorney, Agent, or Firm* — Maier & Maier, PLLC

(57) ABSTRACT

According to one embodiment, a controller of a storage drive receives, from a host, a read request designating a logical address range in a logical address space. The controller transfers, to a host memory in the host, first information indicating whether or not each of a plurality of logical addresses in the logical address range is used by the host. The controller reads, from a storage medium, one or more pieces of valid data stored in one or more logical addresses, respectively, which are used by the host among the plurality of logical addresses. The controller transfers, to the host memory, either pieces of data that respectively correspond to the plurality of logical addresses and include the one or more pieces of valid data, or the one or more pieces of valid data.

11 Claims, 16 Drawing Sheets

STORAGE DRIVE FOR MANAGING A MIGRATION OF VALID DATA

CROSS-REFERENCE TO RELATED APPLICATIONS

This application is based upon and claims the benefit of priority from Japanese Patent Application No. 2024-041284, filed Mar. 15, 2024, the entire contents of which are incorporated herein by reference.

FIELD

Embodiments described herein relate generally to a storage drive that controls a storage medium.

BACKGROUND

In recent years, storage drives that include a storage medium have been widely used. As one of such storage drives, a solid state drive (SSD) that includes a NAND flash memory is known. A storage drive is used as a main storage for various computing devices.

The storage drive may provide a plurality of logical address spaces to a host. An example of the logical address spaces is logical storage areas that is referred to as namespaces. Logical addresses included in each of the namespaces may include a logical address storing valid data and a logical address not storing valid data. In other words, the logical address storing valid data is a logical address that is used by the host. The logical address not storing valid data is a logical address that is not used by the host.

The host may perform a process of migrating data stored in a namespace of a storage drive to another namespace (data migration process). The data migration process may be performed efficiently by using, for example, information (use/non-use information) indicating whether each logical address of the namespace of a migration source stores valid data or not (that is, whether each logical address is used by the host or not).

However, in a case where the host performs the data migration process in consideration of the use/non-use information, a processing amount in the host may increase.

DETAILED DESCRIPTION

In general, according to one embodiment, a storage drive connectable to a host includes a storage medium and a controller. The controller manages a logical address space. The controller receives, from the host, a read request that designates a first logical address range in the logical address space. The controller transfers, to a host memory included in the host, first information indicating whether or not each of a plurality of logical addresses included in the first logical address range is used by the host. The controller reads, from the storage medium, one or more pieces of valid data stored in one or more logical addresses, respectively. The one or more logical addresses are used by the host among the plurality of logical addresses. The controller transfers, to the host memory, either a plurality of pieces of data or the one or more pieces of valid data. The plurality of pieces of data respectively correspond to the plurality of logical addresses and include the one or more pieces of valid data.

Various embodiments will be described hereinafter with reference to the accompanying drawings.

COMPARATIVE EXAMPLE

First, data migration between namespaces in a storage system that includes a storage drive according to a comparative example will be described with reference to FIGS.

1 to 4. The storage drive is, for example, an SSD. A namespace is a logical address space provided by the storage drive to a host. The logical address space includes a plurality of logical addresses. The logical address is used by the host for addressing a storage area of the storage drive. The logical address is, for example, a logical block address (LBA). Hereinafter, a case where the logical address is an LBA will be mainly exemplified.

When using a storage drive, there is a use case where it is desired to read a series of data in a namespace of a storage drive and migrate the data to another namespace of another (alternatively, the same) storage drive. Alternatively, there is also a use case where the series of read data is stored in a host so that the data will be able to be migrated to another namespace in the future, or a use case where data is written to another namespace by using the series of data stored in the host.

Specific examples of such use cases include backup of data stored in a storage drive, migration of a virtual machine (VM) using a storage drive, and generation of a snapshot, but are not limited thereto.

Hereinafter, an outline of an operation of such a use case of data migration between namespaces will be described by using migration of a VM as an example.

Figure 1:
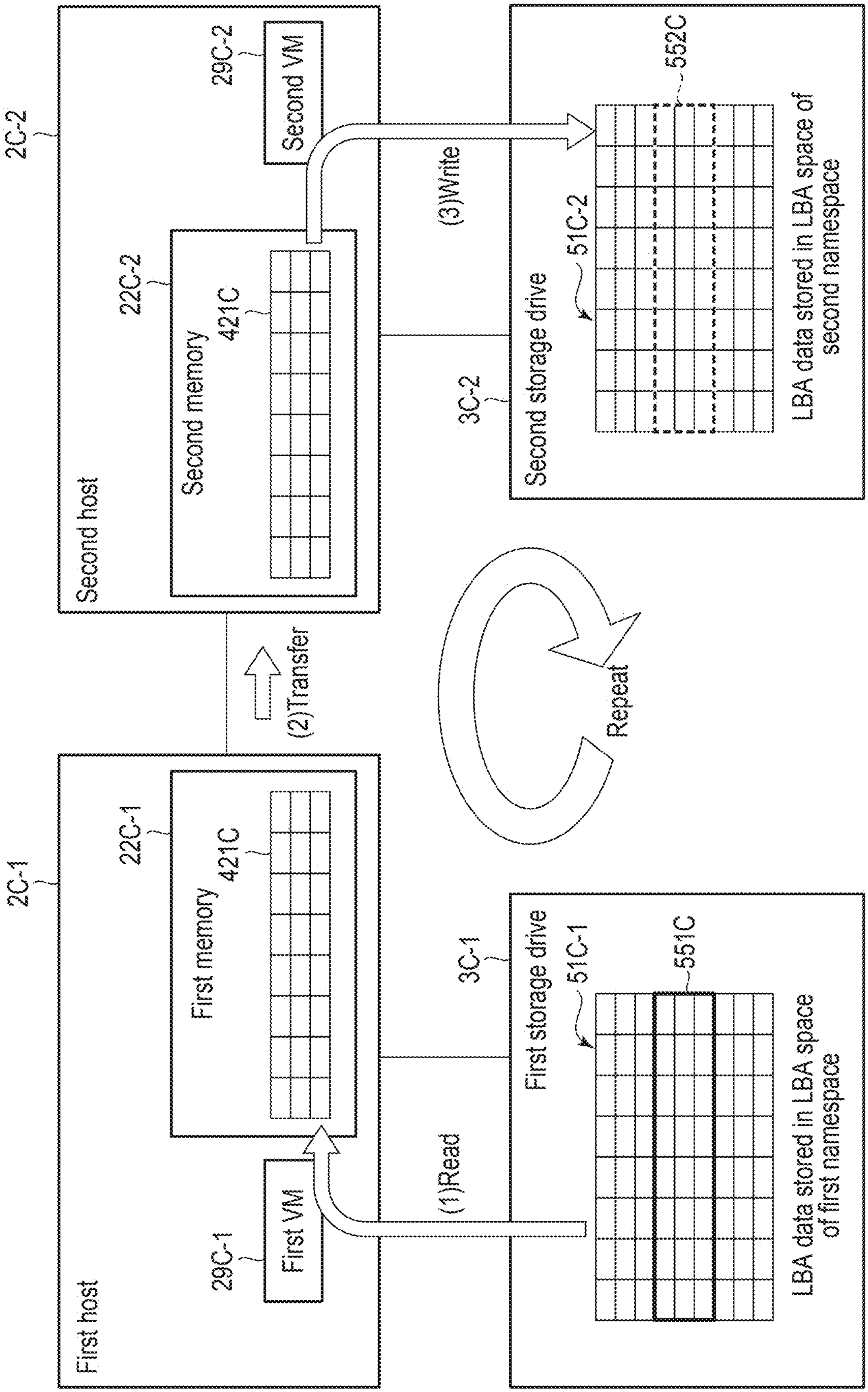
FIG. 1 is a diagram illustrating data migration between namespaces in a storage system that includes a storage drive according to a comparative example.

FIG. 1 illustrates data migration between namespaces in the storage system that includes the storage drive according to the comparative example. Here, it is assumed that data is migrated between namespaces in order to migrate a first VM 29C-1 operating on a first host 2C-1 onto a second host 2C-2 and operate as a second VM 29C-2.

The first host 2C-1 is communicatively connected to each of a first storage drive 3C-1 and the second host 2C-2. The first host 2C-1 includes a first memory 22C-1. The first VM 29C-1 uses a first namespace 51C-1 provided by the first storage drive 3C-1. The first namespace 51C-1 is a source namespace of data migration.

The second host 2C-2 is communicatively connected to each of a second storage drive 3C-2 and the first host 2C-1. The second host 2C-2 includes a second memory 22C-2. The second VM 29C-2 uses a second namespace 51C-2 provided by the second storage drive 3C-2. The second namespace 51C-2 is a destination namespace of the data migration.

The data migration from the first namespace 51C-1 to the second namespace 51C-2 is performed according to following operations (1) to (3).

(1) A series of data stored in the first namespace 51C-1 of the first storage drive 3C-1 is read to the first memory 22C-1 of the first host 2C-1.

(2) The data read to the first memory 22C-1 is transferred to the second memory 22C-2 of the second host 2C-2.

(3) The data transferred to the second memory 22C-2 is written to the second namespace 51C-2 of the second storage drive 3C-2.

There may be a case where it is difficult to read and migrate all the data of the first namespace 51C-1 at one time due to restrictions such as the capacities of the first memory 22C-1 and the second memory 22C-2. In this case, a method is assumed in which reading and writing of data that is obtained by dividing the data of the first namespace 51C-1 is repeated several times, and the whole data of the first namespace 51C-1 is migrated to the second namespace 51C-2. Hereinafter, data that is requested to be read from a namespace by a host and then acquired from a storage drive by the host is also referred to as LBA data.

In FIG. 1, for example, LBA data 421C corresponding to an LBA range 551C in the first namespace 51C-1 is read to the first memory 22C-1 ((1) in FIG. 1). The read LBA data 421C is transferred from the first memory 22C-1 to the second memory 22C-2 ((2) in FIG. 1). The LBA data 421C transferred to the second memory 22C-2 is written to an LBA range 552C in the second namespace 51C-2 ((3) in FIG. 1).

By repeating such an operation, the whole data of the first namespace 51C-1 is migrated to the second namespace 51C-2.

Here, three specific means of data migration between namespaces in the comparative example are shown below.

First means: data migration not using information indicating whether each LBA is used by the host (use/non-use information)

Second means: data migration using use/non-use information managed by the host

Third means: data migration using use/non-use information managed by the storage drive Hereinafter, each means will be described in order.

(First Means: Data Migration not Using Use/Non-Use Information)

The first means is the simplest means of data migration between namespaces among the three means. In the first means, at the time of reading and writing a series of data in data migration between namespaces, LBA data in a designated LBA range is read from a namespace without using the use/non-use information and then the LBA data is written to a designated LBA range in another namespace. Each of the LBA ranges is designated by, for example, a start LBA and the number of LBAs.

Here, the use/non-use information will be described.

An LBA space (for example, a namespace) provided by a storage drive may include an LBA in which data has not yet been written and an LBA from which written data has been deleted. An LBA in a state in which no valid data is stored due to either the fact that data has not yet been written or the fact that written data has been deleted is an LBA that is not used by the host (hereinafter, also referred to as a deallocated LBA). On the other hand, an LBA in a state in which valid data is stored is an LBA used by the host (hereinafter, also referred to as an allocated LBA). The state related to whether or not an LBA is used by the host is also referred to as a use/non-use state (allocation state) of the LBA. In addition, data stored in an LBA used by the host is also referred to as valid data.

A flash translation layer (FTL) included in the storage drive is a functional layer that manages conversion between a logical address (for example, an LBA) and a physical address (for example, a PBA) in a storage medium of the storage drive. The FTL performs garbage collection (GC) because it is necessary to ensure write control characteristics of the storage medium of the storage drive. The GC is a process of copying (or writing) valid data in some physical blocks to another physical block. Through the GC, a physical block from which valid data is copied to another block and in which no valid data is then stored is collected as a physical block to which new data is to be writeable (i.e., as a free block).

It is known that the GC efficiency decreases as an occupancy rate of valid data in the LBA space increases. Thus, the host actively sets an LBA that has not been used to a non-use state (deallocate). As a result, the host increases the GC efficiency of the FTL, improves a write amplification factor (WAF) of the storage drive, increases a throughput, and extends the product longevity.

In a data read operation in the storage drive, a deallocated LBA behaves as if it is an allocated LBA in which a predetermined value such as "FF" or "00" is stored (although it depends on a setting of the storage drive). That is, in a case where the host requests the storage drive to read data from a deallocated LBA, the storage drive returns data of the predetermined value to the host as data of the deallocated LBA. Therefore, in a case where the host reads a series of LBA data from a migration source namespace regardless of the use/non-use state of each LBA, the read LBA data may include valid data corresponding to an allocated LBA and data of the predetermined value corresponding to a deallocated LBA. Further, in a case where the read LBA data is written to a migration destination namespace, the data corresponding to the deallocated LBA in the migration source namespace is written as valid data corresponding to an allocated LBA in the migration destination namespace.

Figure 2:
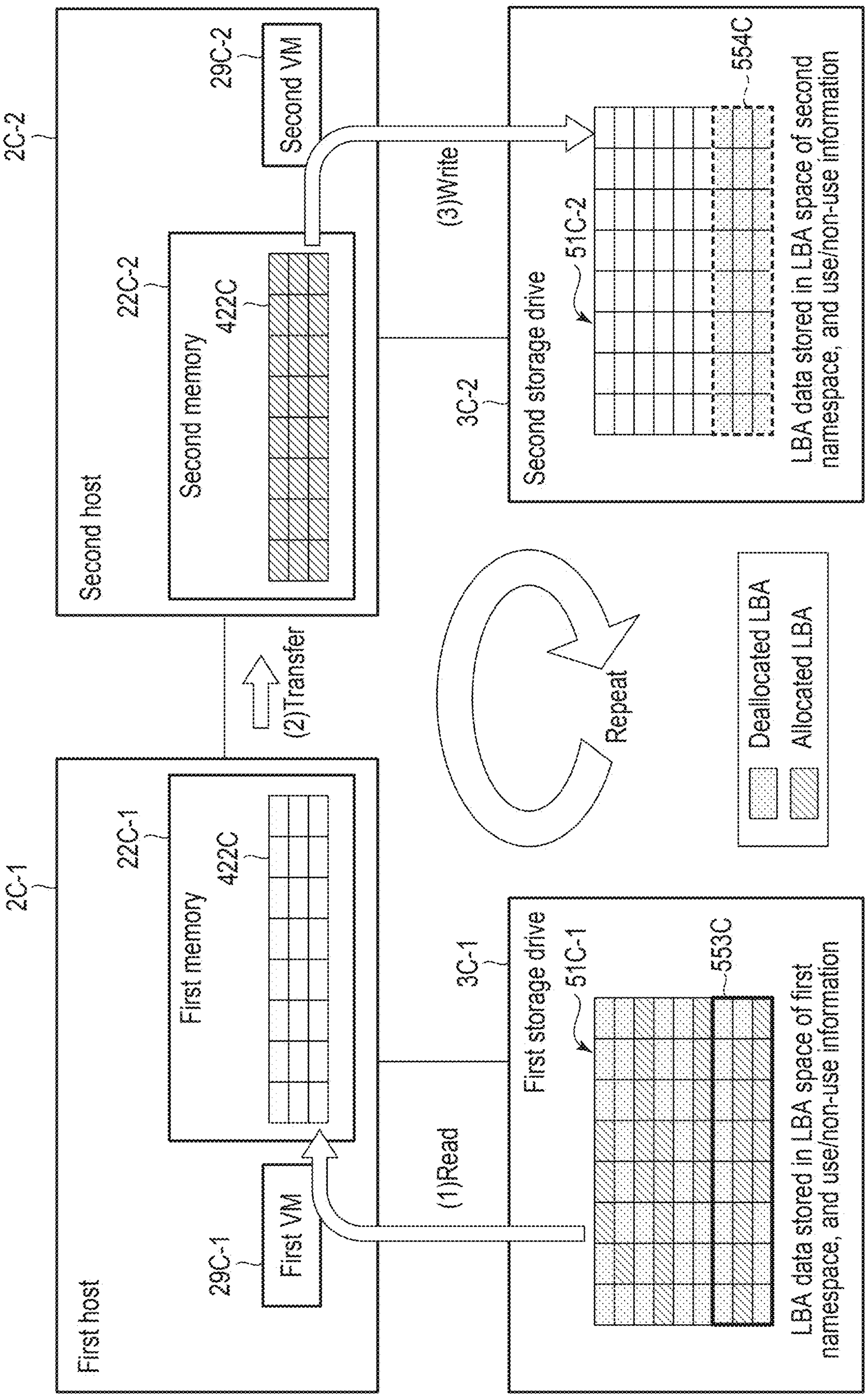
FIG. 2 is a diagram illustrating data migration between namespaces performed by not using use/non-use information of logical addresses, in the storage system that includes the storage drive according to the comparative example.

FIG. 2 illustrates data migration between namespaces not using the use/non-use information (first means), in the storage system that includes the storage drive according to the comparative example. In FIG. 2, whether each LBA included in the first namespace 51C-1 and the second namespace 51C-2 is a deallocated LBA or an allocated LBA is illustrated with different hatching.

In the first means, the use/non-use information is not used when the first host 2C-1 reads data from the first namespace 51C-1 of the first storage drive 3C-1. Therefore, all the series of LBA data read from the first namespace 51C-1 is read as data corresponding to allocated LBAs. In a case where the read LBA data is written to the second namespace 51C-2 of the second storage drive 3C-2, the second storage drive 3C-2 handles all LBAs to which the LBA data is written as allocated LBAs.

In FIG. 2, for example, data corresponding to an LBA range 553C in the first namespace 51C-1 includes data corresponding to deallocated LBAs and data (valid data) corresponding to allocated LBAs are mixed. However, all the data corresponding to the LBA range 553C in the first namespace 51C-1 is read to the first memory 22C-1 as LBA data 422C corresponding to allocated LBAs ((1) in FIG. 2). The read LBA data 422C is transferred from the first memory 22C-1 to the second memory 22C-2 ((2) in FIG. 2). All the LBA data 422C transferred to the second memory 22C-2 is written to an LBA range 554C in the second namespace 51C-2 as data corresponding to allocated LBAs ((3) in FIG. 2).

Therefore, in the data migration according to the first means, the occupancy rate of valid data in the migration destination namespace (here, the second namespace 51C-2) increases. Therefore, in the data migration according to the first means, the GC efficiency in the migration destination namespace decreases.

(Second Means: Data Migration Using Use/Non-Use Information Managed by Host)

In order to avoid the decrease in the GC efficiency in the migration destination namespace, it is conceivable to migrate a use/non-use state of each LBA included in the migration source namespace to the migration destination namespace together with data.

In order to realize this, in the second means, the host uses use/non-use information managed by the host. Specifically, the host reads only valid data corresponding to allocated LBAs from the migration source namespace by using the use/non-use information, and copies the read valid data to the migration destination namespace. In this case, a deallocated LBA in the migration source namespace remains as a deallocated LBA in the migration destination namespace. Therefore, in the data migration according to the second means, the GC efficiency in the migration destination namespace does not decrease.

Figure 3:
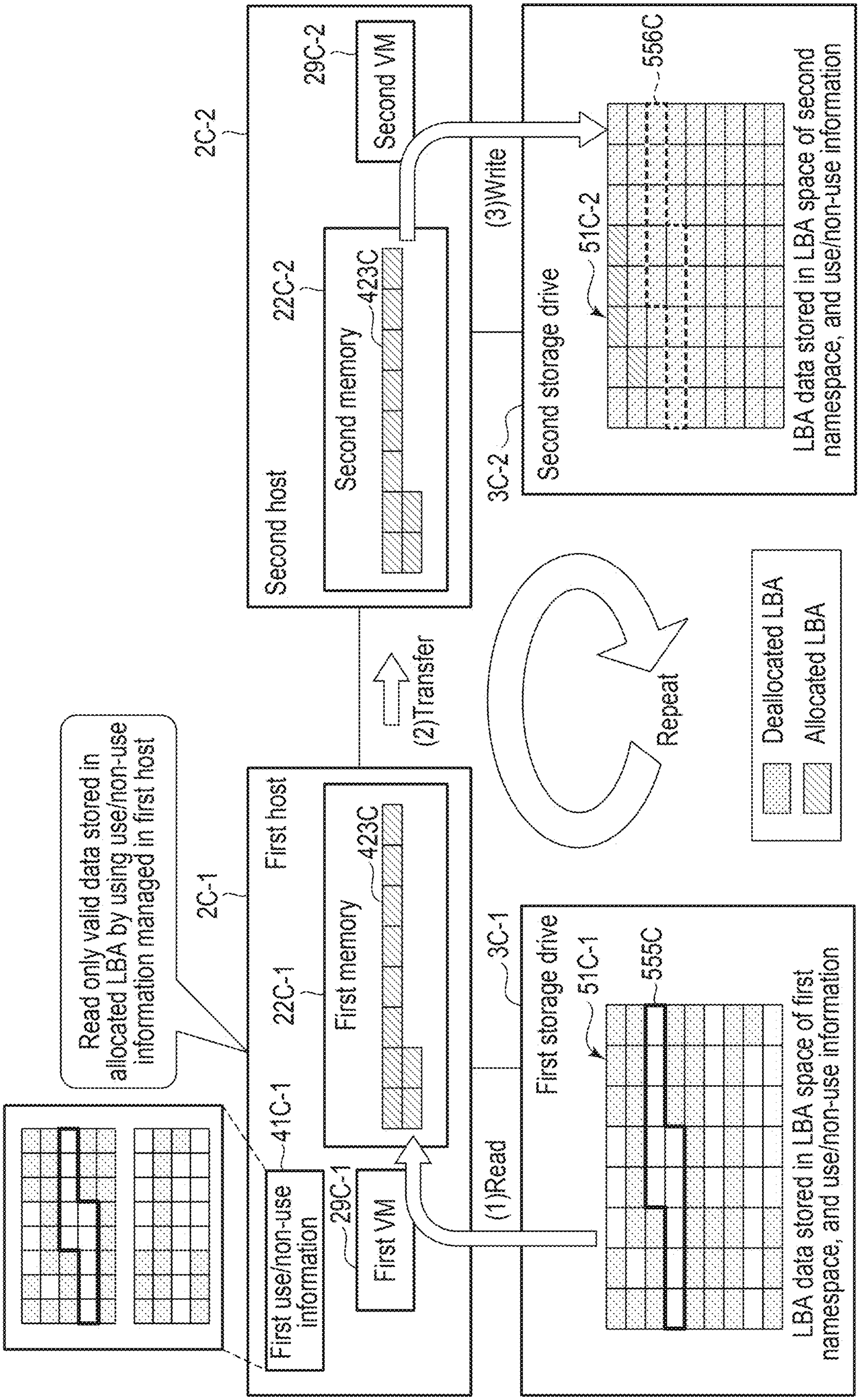
FIG. 3 is a diagram illustrating data migration between namespaces performed by using use/non-use information of logical addresses managed by a host, in the storage system that includes the storage drive according to the comparative example.

FIG. 3 illustrates the data migration between namespaces using the use/non-use information managed by the host (second means), in the storage system that includes the storage drive according to the comparative example. The first host 2C-1 manages first use/non-use information 41C-1. The first use/non-use information 41C-1 includes information for identifying whether or not each LBA in the first namespace 51C-1 is used by the first host 2C-1.

In the second means, the first use/non-use information 41C-1 is used when the first host 2C-1 reads data from the first namespace 51C-1. When reading data from the first namespace 51C-1, the first host 2C-1 reads only valid data corresponding to allocated LBAs by using the first use/non-use information 41C-1. In a case where the read valid data is written to the second namespace 51C-2 of the second storage drive 3C-2, the second storage drive 3C-2 handles an LBA to which the valid data is written as an allocated LBA and handles an LBA to which the valid data is not written as a deallocated LBA. Therefore, the second storage drive 3C-2 can handle only LBAs that are managed as the allocated LBAs in the first use/non-use information 41C-1 by the first host 2C-1, as allocated LBAs.

In FIG. 3, for example, the first host 2C-1 identifies an LBA range 555C in the first namespace 51C-1 that includes only allocated LBAs by using the first use/non-use information 41C-1, and reads valid data 423C stored in the LBA range 555C to the first memory 22C-1 ((1) in FIG. 3). The read valid data 423C is transferred from the first memory 22C-1 to the second memory 22C-2 ((2) in FIG. 3). The valid data 423C transferred to the second memory 22C-2 is written to an LBA range 556C in the second namespace 51C-2 as data corresponding to allocated LBAs ((3) in FIG. 3). Since the second storage drive 3C-2 handles only LBAs to which valid data is written (here, the LBA range 556C) as allocated LBAs, the GC efficiency in the second namespace 51C-2 does not decrease.

However, in the second means, there is an overhead in which the first host 2C-1 confirms a use/non-use state of each LBA in the first namespace 51C-1 by using the first use/non-use information 41C-1 managed by the first host 2C-1 and determines whether to perform reading and writing of data for each LBA.

The process of confirming a use/non-use state of each LBA in a namespace by using the use/non-use information managed by the host is often complicated. For example, in a case where a use/non-use state of each LBA is managed in a layer of a file system, an LBA space managed by the file system may not correspond to an LBA space managed by the storage drive. This is, for example, a case where a device mapper at a lower layer than the file system performs conversion between address spaces. Alternatively, in a case where an operating system (OS) that manages the use/non-use information operates on a VM, there may be a case where a virtual machine monitor (VMM) that hosts the VM performs conversion between LBA spaces. In addition to them, it cannot be denied that there is a module that operates a state of an LBA. Under such circumstances, the process of confirming a use/non-use state of each LBA in the namespace by using the use/non-use information managed by the host is complicated.

(Third Means: Data Migration Using Use/Non-Use Information Managed by Storage Drive)

In order to avoid an overhead caused by a complicated process in which a use/non-use state of each LBA in a namespace is confirmed by using the use/non-use information managed by the host, it is conceivable to cause the storage drive to provide use/non-use information of an LBA space.

Figure 4:
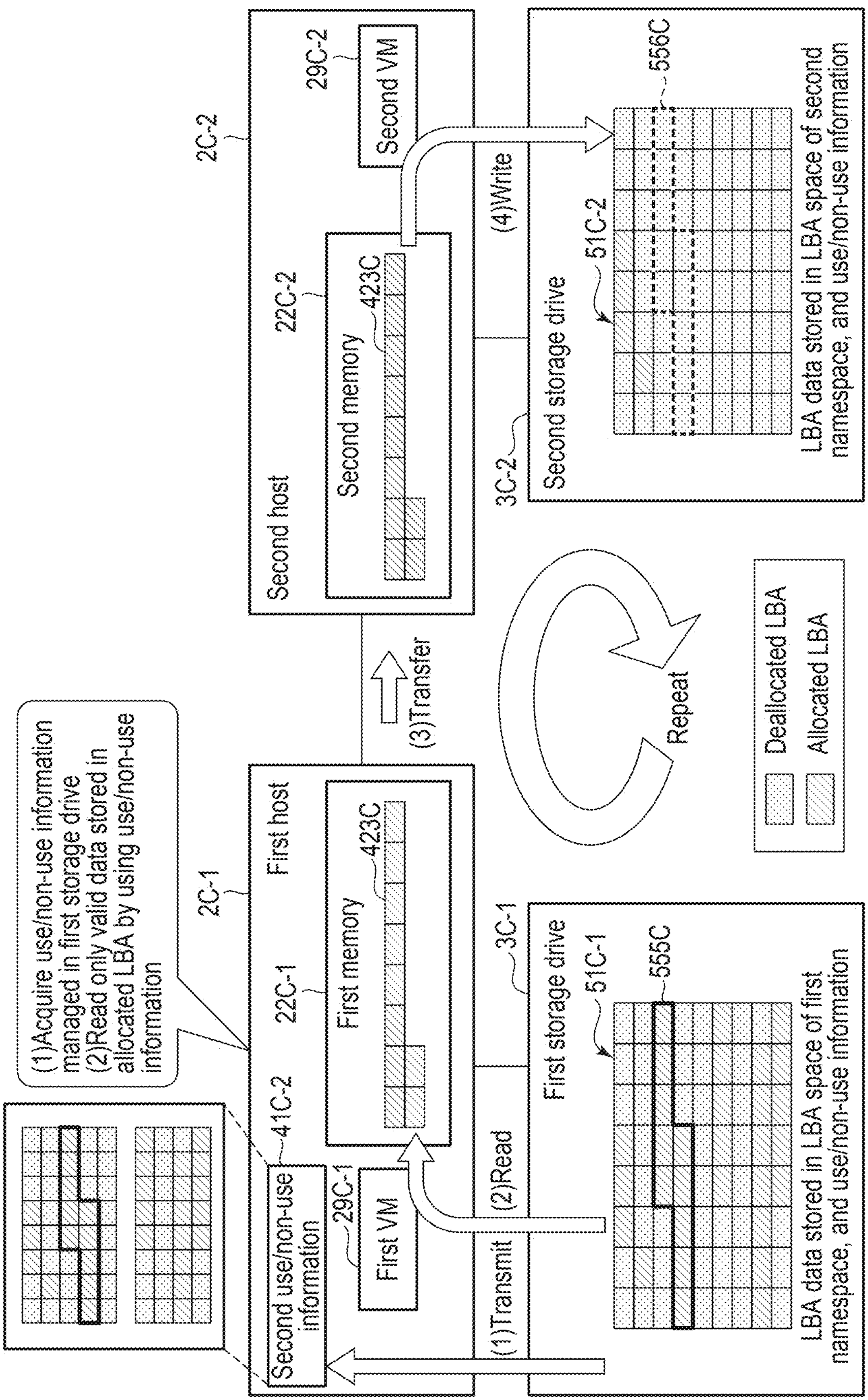
FIG. 4 is a diagram illustrating data migration between namespaces performed by using use/non-use information of logical addresses managed by the storage drive, in the storage system that includes the storage drive according to the comparative example.

FIG. 4 illustrates data migration between namespaces using use/non-use information managed by the storage drive (third means), in the storage system that includes the storage drive according to the comparative example. The first storage drive 3C-1 has a function of managing second use/non-use information 41C-2 and providing the second use/non-use information 41C-2 to the first host 2C-1. The second use/non-use information 41C-2 includes information indicating whether or not each LBA in the first namespace 51C-1 is used by the first host 2C-1.

In the third means, the second use/non-use information 41C-2 is used when the first host 2C-1 reads data from the first namespace 51C-1. When reading data from the first namespace 51C-1, the first host 2C-1 reads only valid data corresponding to allocated LBAs by using the second use/non-use information 41C-2. In a case where the read valid data is written to the second namespace 51C-2 of the second storage drive 3C-2, the second storage drive 3C-2 handles an LBA to which the valid data is written as an allocated LBA and handles an LBA to which the valid data is not written as a deallocated LBA. Therefore, the second storage drive 3C-2 can handle only LBAs managed as the allocated LBAs in the second use/non-use information 41C-2, as allocated LBAs.

In FIG. 4, the first host 2C-1 acquires the second use/non-use information 41C-2, which is managed by the first storage drive 3C-1, from the first storage drive 3C-1 ((1) in FIG. 4). For example, the first host 2C-1 identifies an LBA range 555C in the first namespace 51C-1 that includes only allocated LBAs by using the second use/non-use information 41C-2, and reads valid data 423C stored in the LBA range 555C to the first memory 22C-1 ((2) in FIG. 4). The read valid data 423C is transferred from the first memory 22C-1 to the second memory 22C-2 ((3) in FIG. 4). The valid data 423C transferred to the second memory 22C-2 is written to a LBA range 556C in the second namespace 51C-2 as data corresponding to allocated LBAs ((4) in FIG. 4). Since the second storage drive 3C-2 handles only LBAs to which valid data is written (here, the LBA range 556C) as allocated LBAs, the GC efficiency in the second namespace 51C-2 does not decrease.

In the third means, the host can acquire use/non-use information from the storage drive. The host reads valid data corresponding to allocated LBAs from a migration source namespace by using the acquired use/non-use information, and writes the read valid data to a migration destination namespace. Therefore, an overhead of the process can be reduced compared with the second means.

However, also in the third means, the host needs to determine which data of an LBA is migrated by using the use/non-use information. In addition, the host issues a large number of read commands to the storage drive so that only valid data corresponding to allocated LBAs is read from the migration source namespace. Further, the host issues a large number of write commands to the storage drive so that only the valid data corresponding to the allocated LBAs is written to the migration destination namespace.

Thus, in the third means, compared with the first means, the determination process using the use/non-use information is added, and the number of read commands and write commands to be issued increases depending on a use/non-use state of each LBA in the LBA space. Therefore, the complicated process in the host causes an overhead.

In contrast to the above comparative example, a storage drive according to an embodiment can reduce a processing amount in a host. Hereinafter, a storage system that includes a storage drive according to each of embodiments will be described.

First Embodiment

Figure 5:
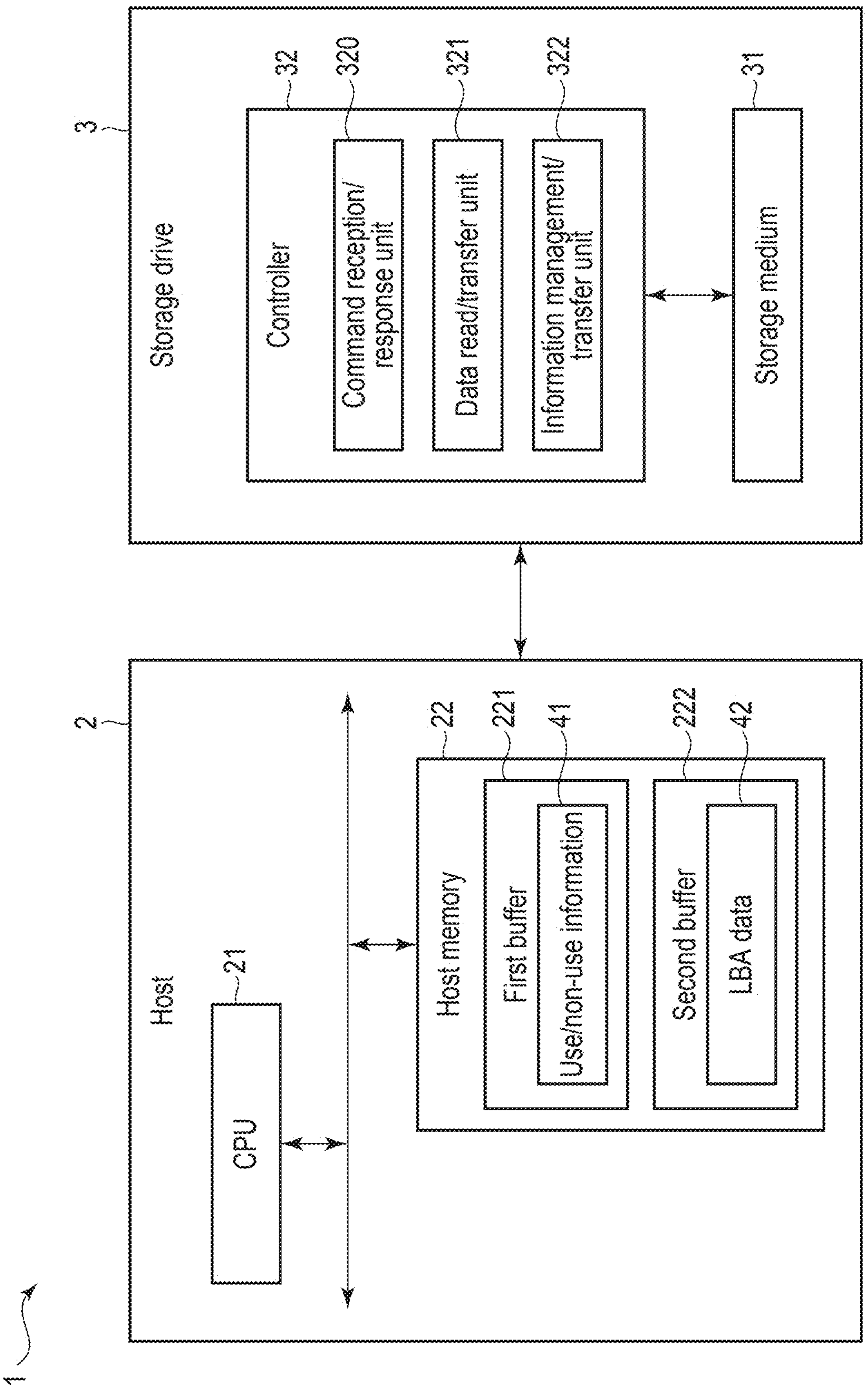
FIG. 5 is a block diagram illustrating a configuration example of a storage system that includes a storage drive according to a first embodiment.

FIG. 5 is a block diagram illustrating a configuration example of a storage system 1 that includes a storage drive 3 according to a first embodiment. The storage system 1 includes a host device 2 and the storage drive 3.

The host device 2 may be a storage server that stores a large amount of various data in the storage drive 3, or may be a personal computer. Hereinafter, the host device 2 is also referred to as a host 2.

The storage drive 3 is a storage device configured to write data to a storage medium 31 and read data from the storage medium 31. The storage drive 3 is implemented as, for example, a solid state drive (SSD) or a hard disk drive (HDD). The storage drive 3 is also referred to as a memory system or a storage device.

The storage drive 3 may be used as a storage of the host 2. The storage drive 3 is connectable to the host 2 via a cable or a network. The storage drive 3 may be provided inside the host 2.

As an example, an interface for connecting the host 2 and the storage drive 3 conforms to standards such as PCI Express™ (PCIe™), Ethernet™, Fibre channel, NVM Express™ (NVMe™), UFS, M-PHY, or USB.

A configuration example of the host 2 and the storage drive 3 will be described below.

The host 2 includes, for example, a central processing unit (CPU) 21 and a host memory 22. The CPU 21 and the host memory 22 may be connected via a bus.

The CPU 21 is, for example, at least one processor. The CPU 21 controls operations of various components of the host 2. The CPU 21 issues various commands (for example, input/output (I/O) commands and various control commands) to the storage drive 3. The I/O commands include, for example, a read command and a write command. The control commands include, for example, a trim command (unmap command). The host 2 may include control circuitry (interface circuitry) that controls communication (data transfer) between the host 2 and the storage drive 3.

The host memory 22 is, for example, a dynamic random access memory (DRAM). A storage area of the host memory 22 is allocated as, for example, a first buffer 221 and a second buffer 222. The first buffer 221 is a buffer area of use/non-use information 41. The second buffer 222 is a buffer area of LBA data 42. To the host memory 22, a controller 32 of the storage drive 3 is capable of performing direct memory access (DMA), for example.

The storage drive 3 includes, for example, a storage medium 31 (or storage media) and the controller 32.

The storage medium 31 is a nonvolatile storage medium. The storage medium 31 is, for example, a nonvolatile memory, a magnetic disk, or an optical disc. The nonvolatile memory is, for example, a NAND flash memory. To the storage medium 31, for example, user data is written in accordance with a request from the host 2.

The controller 32 is control circuitry that controls operations of various components of the storage drive 3. The controller 32 is, for example, realized by circuitry such as a system-on-a-chip (SoC). The controller 32 is capable of performing DMA to the host memory 22. Specifically, the controller 32 is capable of transferring data from the host memory 22 to the storage drive 3 without passing through the CPU 21 of the host 2. In addition, the controller 32 is capable of transferring data from the storage drive 3 to the host memory 22 without passing through the CPU 21 of the host 2.

The controller 32 may include a memory (for example, a static random access memory (SRAM)). A memory (for example, DRAM) may be connected to the controller 32. A storage area of such a memory may be allocated as, for example, a storage area of use/non-use information managed by the storage drive 3 and a storage area of various data transferred from the host 2 (host memory 22).

The controller 32 functions as a media controller configured to control the storage medium 31.

The controller 32 manages one or more LBA spaces that are provided to the host 2. Each LBA space is, for example, a namespace. The controller 32 may function as an FTL configured to execute management of the storage medium 31. The management executed by the FTL includes management of mapping information indicative of a relationship between each LBA in the LBA space and each PBA of the storage medium 31 (for example, a logical-to-physical address conversion table), and GC.

The controller 32 includes a circuit that receives various commands and data from the host 2. In addition, the controller 32 includes a circuit that transmits a response to a command and data to the host 2.

The controller 32 includes, for example, a circuit that electrically connects the controller 32 and the storage medium 31. As an example, this circuit conforms to an interface standard such as a toggle DDR or an open NAND flash interface (ONFI).

The function of each unit of the controller 32 may be realized by dedicated hardware in the controller 32 or may be realized by a CPU of the controller 32 executing firmware (FW).

The controller 32 functions as, for example, a command reception/response unit 320, a data read/transfer unit 321, and an information management/transfer unit 322. The controller 32 functions as these units, for example, by executing the FW.

The command reception/response unit 320 receives a command issued by the host 2. The command reception/response unit 320 causes the data read/transfer unit 321 and the information management/transfer unit 322 to perform a process in accordance with the received command. In addition, the command reception/response unit 320 returns, to the host 2, a response indicative of completion of the process in accordance with the received command.

When the command reception/response unit 320 has received a read command from the host 2, the data read/transfer unit 321 transfers data in an LBA range designated by the read command (i.e., LBA data) to the host memory 22. Specifically, in a case where the designated LBA range includes at least one allocated LBA, the data read/transfer unit 321 reads data (that is, valid data) stored in the allocated LBA, from the storage medium 31. In a case where the designated LBA range includes no allocated LBA, the data read/transfer unit 321 does not read data (valid data) from the storage medium 31. In a case where the designated LBA range includes a deallocated LBA, the data read/transfer unit 321 generates, for example, data of a predetermined value such as "FF" or "00" as data of the deallocated LBA. Alternatively, in a case where the designated LBA range includes a deallocated LBA, the data read/transfer unit 321 may read specific data from the storage medium 31. Data of a deallocated LBA may be acquired by using a method according to a specification of the storage drive 3, which is not limited to the above methods.

The information management/transfer unit 322 manages use/non-use information corresponding to an LBA space (for example, a namespace). The use/non-use information indicates a use/non-use state of each LBA of the LBA space that is provided by the storage drive 3 to the host 2. The use/non-use information is, for example, information in a bitmap format in which a plurality of bits that correspond to a plurality of LBAs included in the LBA space, respectively, are sequentially arranged. As an example, in a case where an LBA is an allocated LBA, a bit corresponding to the LBA is set to "1". In addition, in a case where an LBA is a deallocated LBA, a bit corresponding to the LBA is set to "0". The use/non-use information is not limited to the bitmap format. For example, a format may be used in which a bit indicating whether a start LBA is an allocated LBA or not is disposed at the head, and thereafter, bits indicative of a length in which LBAs in the same use/non-use state as the previous LBA are contiguous are arranged. As a format of the use/non-use information, any format that is not limited to the above-described formats may be used as long as the format is consistent in the system. Note that, for example, the information management/transfer unit 322 may dynamically generate the use/non-use information by using the logical-to-physical address conversion table when the host 2 has requested to provide the use/non-use information. The logical-to-physical address conversion table is data indicative of a relationship between each LBA and each PBA.

When the command reception/response unit 320 has received a specific read command from the host 2, the information management/transfer unit 322 transfers use/non-use information of an LBA range designated by the read command, to the host memory 22. The specific read command is, for example, a read command of data with use/non-use information (hereinafter, also referred to as a first read command).

Figure 6:
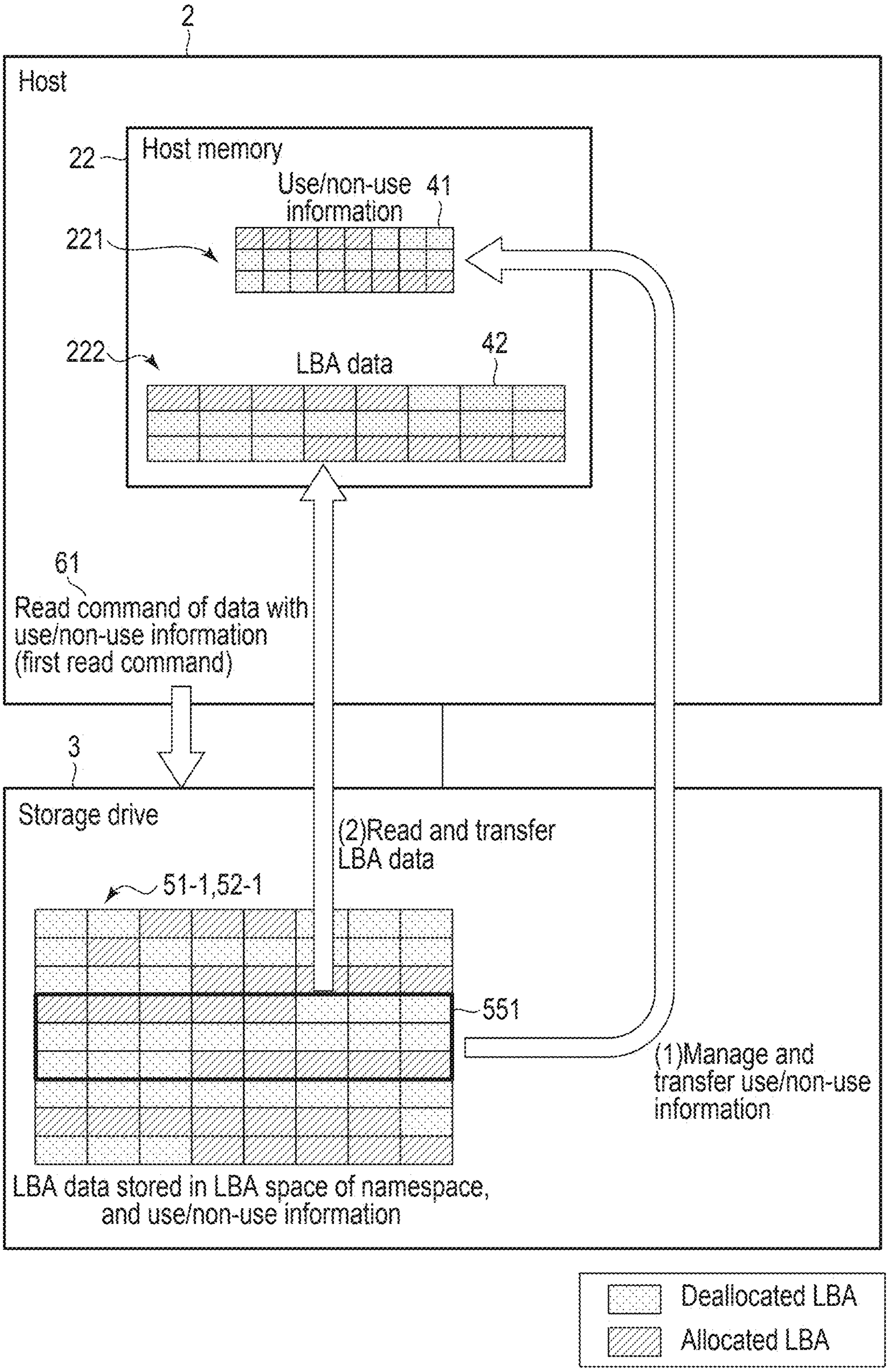
FIG. 6 is a diagram illustrating an example of a read operation of data with use/non-use information, in the storage system that includes the storage drive according to the first embodiment.

FIG. 6 illustrates an example of a read operation of data with use/non-use information, in the storage system 1 that includes the storage drive 3 according to the first embodiment. The storage drive 3 of the first embodiment has a first read function of data with use/non-use information. The first read function of data with use/non-use information is a function of, in response to a first read command 61 received from the host 2, providing the host 2 with data (LBA data) that corresponds to an LBA range designated by the first read command 61 and use/non-use information of the designated LBA range.

Here, a case where the host 2 uses a namespace 51-1 in the storage drive 3 will be exemplified. The information management/transfer unit 322 of the storage drive 3 manages use/non-use information 52-1 that indicates a use/non-use state of each LBA of the namespace 51-1. In FIG. 6, each of pieces of LBA data (i.e., piece of data of each LBA) stored in an LBA space of the namespace 51-1 is illustrated with hatching that represents a use/non-use state of a corresponding LBA (that is, a deallocated LBA or an allocated LBA) in the namespace 51-1. This use/non-use state of each LBA corresponds to the use/non-use information 52-1.

FIG. 6 illustrates a case where the first read command 61 designates an LBA range 551. In this case, use/non-use information 41 corresponding to the LBA range 551 is stored in the first buffer 221 in the host memory 22. Further, LBA data 42 corresponding to the LBA range 551 is stored in the second buffer 222 in the host memory 22.

The first read command 61 is a command for requesting to read LBA data 42 corresponding to a specific LBA range and to provide use/non-use information 41 of the specific LBA range. The first read command 61 designates: (a) a start LBA and an LBA size (the number of LBAs); and (b) a first buffer address indicative of the first buffer 221 in the host memory 22 in which the use/non-use information 41 is to be stored and a second buffer address indicative of the second buffer 222 in the host memory 22 in which the LBA data 42 is to be stored. Note that information corresponding to the specific LBA range that is at least part of the use/non-use information 52-1 managed by the storage drive 3 is stored as the use/non-use information 41 in the host memory 22.

By the start LBA and the LBA size being designated in the first read command 61, an LBA range (hereinafter, also referred to as a first LBA range) 551 corresponding to LBA data to be acquired is identified.

The first buffer 221 has a size in which the use/non-use information 41 provided by the storage drive 3 in accordance with the first read command 61 can be stored. The first buffer address is, for example, an address indicative of the start of the first buffer 221.

The second buffer 222 has a size in which the LBA data 42 provided by the storage drive 3 in accordance with the first read command 61 can be stored. More specifically, the second buffer 222 includes a plurality of storage areas that correspond to a plurality of LBAs included in the first LBA range 551, respectively. Each of the plurality of storage areas has a size in which data logically stored in one LBA (i.e., LBA data) can be stored. In a case where a plurality of pieces of data are acquired from the plurality of LBAs in the first LBA range 551, respectively, in accordance with the first read command 61, the acquired plurality of pieces of data are stored in the plurality of storage areas in the second buffer 222 in order of LBAs. The second buffer address is, for example, an address indicative of the start of the second buffer 222.

In the controller 32 of the storage drive 3, the command reception/response unit 320 receives the first read command 61 from the host 2. When the command reception/response unit 320 has received the first read command 61, following operations are performed in the storage drive 3.

(1) The information management/transfer unit 322 transfers the use/non-use information 41 in the managed use/non-use information 52-1, that corresponds to the LBA range (first LBA range) 551 designated by the first read command 61, to the first buffer 221 in the host memory 22 based on the first buffer address.

(2) The data read/transfer unit 321 acquires the LBA data 42 corresponding to the first LBA range 551 and transfers the acquired LBA data 42 to the second buffer 222 in the host memory 22 based on the second buffer address.

The procedure of (2) will be specifically described. The data read/transfer unit 321 acquires a plurality of pieces of data that correspond to a plurality of LBAs included in the first LBA range 551, respectively. The data read/transfer unit 321 reads, for example, from the storage medium 31, one or more pieces of valid data that are stored in one or more allocated LBAs in the first LBA range 551, respectively. Furthermore, the data read/transfer unit 321 acquires, for example, a piece of data of the predetermined value such as "FF" or "00" as a piece of data stored in each deallocated LBA in the first LBA range 551. The plurality of pieces of data that correspond to the plurality of LBAs included in the first LBA range 551, respectively, may include the read one or more pieces of valid data and the acquired piece of data of the predetermined value. The data read/transfer unit 321 transfers the acquired plurality of pieces of data to the plurality of storage areas of the second buffer 222, respectively, based on the second buffer address.

In the storage drive 3, the procedure of (1) and (2) is repeatedly performed until processes on all LBAs of the namespace 51-1 are completed.

With the above configuration, in response to the first read command 61, the storage drive 3 can provide the host 2 with the LBA data 42 corresponding to the designated first LBA range 551 and the use/non-use information 41 of the designated LBA range 551. In the host 2, for example, there is no overhead in which a use/non-use state of each LBA in the namespace 51-1 is confirmed and data is read by using the use/non-use information 41. Therefore, according to the first embodiment, for example, in a case where data is migrated from the namespace 51-1 of the storage drive 3 to another namespace, a processing amount in the host 2 can be reduced.

Second Embodiment

The storage drive 3 according to the first embodiment provides the host 2 with LBA data corresponding to a specific LBA range and use/non-use information of the specific LBA range. That is, the storage drive 3 of the first embodiment corresponds to a storage drive 3 that includes a migration source namespace.

On the other hand, a storage drive 3 according to a second embodiment writes LBA data corresponding to a specific LBA range transferred from a host 2 to an LBA space (namespace) on the basis of use/non-use information of the specific LBA range. That is, the storage drive 3 of the second embodiment corresponds to a storage drive 3 that includes a migration destination namespace.

A configuration of a storage system that includes the storage drive 3 of the second embodiment is similar to the configuration of the storage system that includes the storage drive 3 of the first embodiment. The second embodiment is different from the first embodiment in terms of a process for migrating data to the migration destination namespace. Hereinafter, the difference from the first embodiment will be mainly described.

Figure 7:
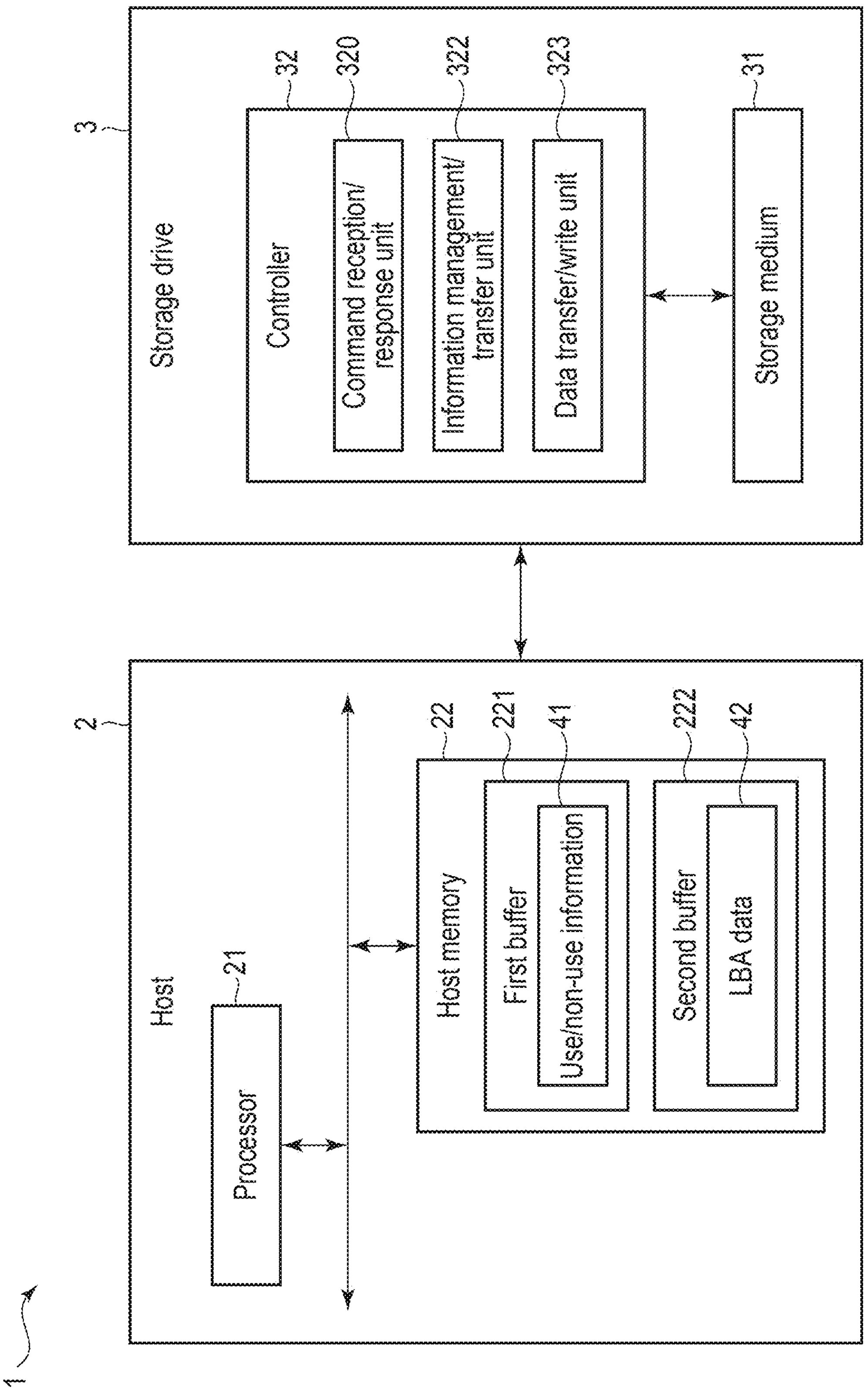
FIG. 7 is a block diagram illustrating a configuration example of a storage system that includes a storage drive according to a second embodiment.

FIG. 7 is a block diagram illustrating a configuration example of the storage system 1 that includes the storage drive 3 according to the second embodiment. The storage system 1 includes the host 2 and the storage drive 3.

A configuration of the host 2 is similar to the configuration of the host 2 described above with reference to FIG. 5. A storage area of the host memory 22 of the host 2 is allocated as, for example, the first buffer 221 and the second buffer 222. Hereinafter, it is assumed that the use/non-use information 41 is stored in the first buffer 221 and the LBA data 42 is stored in the second buffer 222.

A configuration of the storage drive 3 is similar to the configuration of the storage drive 3 described above with reference to FIG. 5 except for a function of the controller 32. The controller 32 functions, in addition to the command reception/response unit 320 and the information management/transfer unit 322, as a data transfer/write unit 323. The controller 32 may function as the data read/transfer unit 321 described in the first embodiment.

The command reception/response unit 320 receives a command issued by the host 2. The command reception/response unit 320 causes the information management/transfer unit 322 and the data transfer/write unit 323 to perform a process in accordance with the received command. In addition, the command reception/response unit 320 returns, to the host 2, a response indicative of completion of the process in accordance with the received command.

The information management/transfer unit 322 manages use/non-use information corresponding to an LBA space. When the command reception/response unit 320 has received a specific write command from the host 2, the information management/transfer unit 322 transfers the use/non-use information 41 from the host memory 22 on the basis of an address designated by the received write command. The specific write command is a write command of data with use/non-use information (hereinafter, also referred to as a first write command). The information management/transfer unit 322 updates the managed use/non-use information by using the transferred use/non-use information 41.

When the command reception/response unit 320 has received the specific write command (for example, the first write command) from the host 2, the data transfer/write unit 323 transfers the LBA data 42 from the host memory 22 on the basis of an address designated by the received write command. The data transfer/write unit 323 writes the LBA data 42 to an LBA range designated by the write command by using the use/non-use information 41 transferred by the information management/transfer unit 322. Specifically, with respect to an allocated LBA among LBAs of the LBA range designated by the write command, the data transfer/write unit 323 writes corresponding LBA data 42 (valid data) to the storage medium 31 by using the use/non-use information 41. On the other hand, with respect to a deallocated LBA among the LBAs, the data transfer/write unit 323 does not write corresponding LBA data 42 to the storage medium 31.

Figure 8:
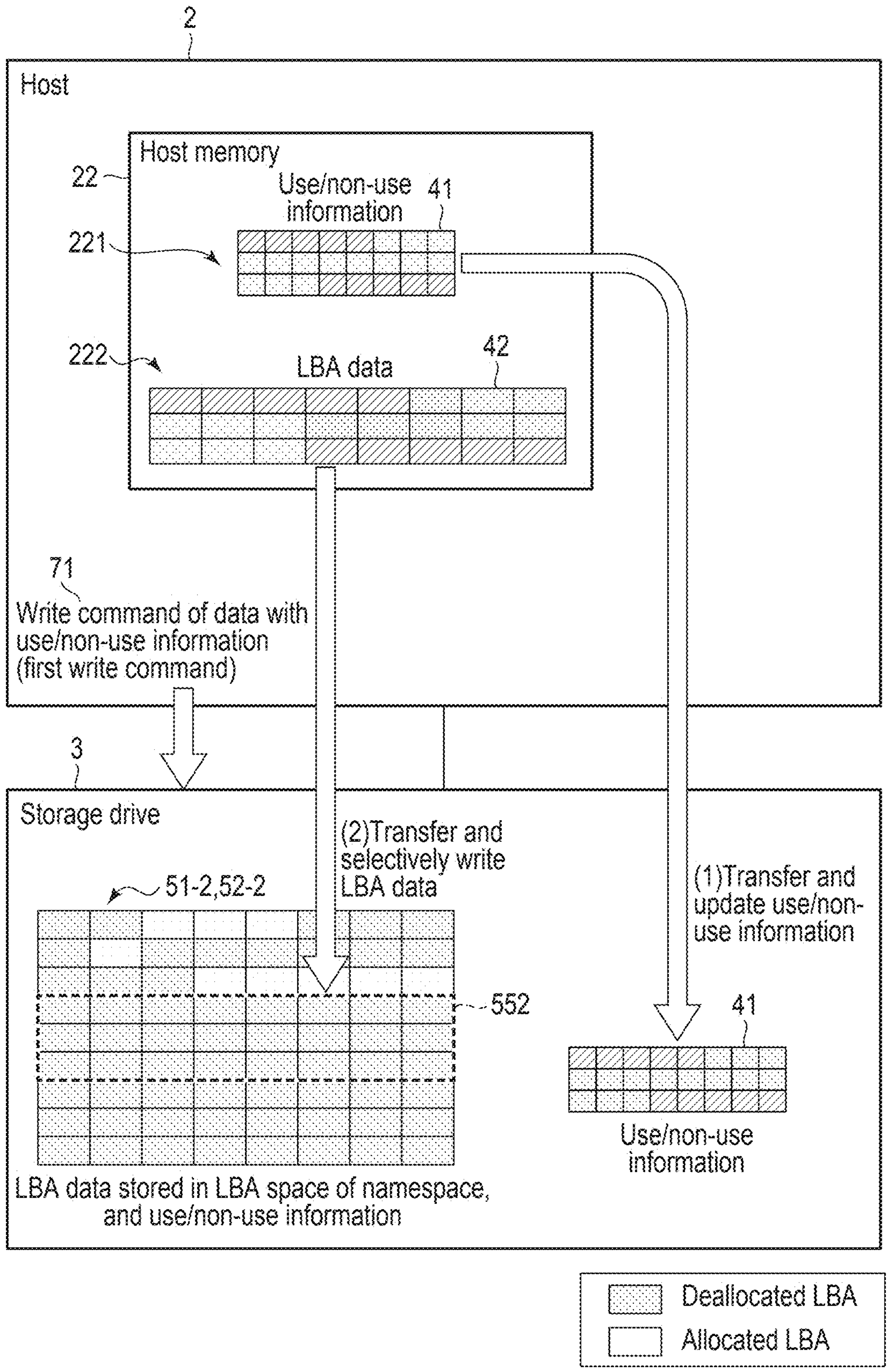
FIG. 8 is a diagram illustrating an example of a write operation of data with use/non-use information, in the storage system that includes the storage drive according to the second embodiment.

FIG. 8 illustrates an example of a write operation of data with use/non-use information, in the storage system 1 that includes the storage drive 3 according to the second embodiment. The storage drive 3 of the second embodiment has a first write function of data with use/non-use information. The first write function of data with use/non-use information is a function of, in response to a first write command 71 being received from the host 2, writing LBA data corresponding to an LBA range designated by the first write command 71 to an LBA space (namespace) on the basis of use/non-use information of the designated LBA range.

Here, a case where the host 2 uses a namespace 51-2 in the storage drive 3 will be exemplified. The information management/transfer unit 322 of the storage drive 3 manages use/non-use information 52-2 indicative of a use/non-use state of each LBA of the namespace 51-2. In FIG. 8, each of pieces of data (LBA data) stored in an LBA space of the namespace 51-2 is illustrated with hatching that represents a use/non-use state of a corresponding LBA in the namespace 51-2. This use/non-use state of each LBA corresponds to the use/non-use information 52-2.

FIG. 8 illustrates a case where an LBA range 552 is designated by the first write command 71. In this case, the use/non-use information 52-2 corresponding to the LBA range 552 is replaced with the use/non-use information 41 transferred from the host memory 22. In addition, valid data of the LBA data 42 transferred from the host memory 22 is written to the LBA range 552.

The first write command 71 is a command for requesting to write, based on the use/non-use information 41, the LBA data 42 corresponding to a specific LBA range. The first write command 71 designates: (a) a start LBA and an LBA size; and (b) a first buffer address indicative of the first buffer 221 in the host memory 22 in which the use/non-use information 41 is stored and a second buffer address indicative of the second buffer 222 in the host memory 22 in which the LBA data 42 is stored.

By the start LBA and the LBA size being designated in the first write command 71, the LBA range (hereinafter, also referred to as a second LBA range) 552 that corresponds to LBA data to be written is identified.

The first buffer 221 stores the use/non-use information 41 that is provided to the storage drive 3 in accordance with the first write command 71.

The second buffer 222 stores the LBA data 42 that is provided to the storage drive 3 in accordance with the first write command 71. More specifically, the second buffer 222 includes a plurality of storage areas that correspond to a plurality of LBAs included in the second LBA range 552, respectively. Each of the plurality of storage areas has a size in which data logically stored in one LBA can be stored. In a case where a plurality of pieces of data that correspond to the plurality of LBAs in the second LBA range 552, respectively, are provided in accordance with the first write command 71, the plurality of pieces of data are stored in the plurality of storage areas of the second buffer 222 in order of LBAs.

In the controller 32 of the storage drive 3, the command reception/response unit 320 receives the first write command 71 from the host 2. When the command reception/response unit 320 has received the first write command 71, following operations are performed in the storage drive 3.

(1) The information management/transfer unit 322 transfers the use/non-use information 41 from the first buffer 221 in the host memory 22 based on the first buffer address. The information management/transfer unit 322 updates, in the managed use/non-use information 52-2, use/non-use information that corresponds to the LBA range (second LBA range) 552 designated by the first write command 71 with the use/non-use information 41.

(2) The data transfer/write unit 323 transfers the LBA data 42 from the second buffer 222 in the host memory 22 based on the second buffer address. The data transfer/write unit 323 writes the LBA data 42 that corresponds to an allocated LBA in the second LBA range 552 to the LBA in the namespace 51-2, based on the use/non-use information 41.

The operation of (2) will be specifically described. First, the data transfer/write unit 323 transfers the plurality of pieces of data included in the LBA data 42 from the plurality of storage areas included in the second buffer 222, respectively, based on the second buffer address. The plurality of pieces of data correspond to the plurality of LBAs included in the second LBA range 552, respectively. Each of the plurality of pieces of data is data to be stored in the corresponding LBA. The data transfer/write unit 323 identifies an allocated LBA in the second LBA range 552 on the basis of the use/non-use information 41. The data transfer/write unit 323 selects a piece of data (that is, a piece of valid data) corresponding to the identified allocated LBA from the plurality of pieces of data included in the LBA data 42. The data transfer/write unit 323 writes the selected piece of valid data to the identified allocated LBA in the namespace 51-2. That is, the data transfer/write unit 323 writes the selected piece of valid data to the storage medium 31 and associates the selected piece of valid data with the corresponding allocated LBA in the namespace 51-2. Note that the data read/transfer unit 321 does not write a piece of data corresponding to a deallocated LBA in the second LBA range 552 to the namespace 51-2 (more specifically, the storage medium 31).

In the storage drive 3, the procedure of (1) and (2) is repeatedly performed until processes on all LBAs of the namespace 51-2 are completed.

With the above configuration, in response to the first write command 71, the storage drive 3 can write valid data corresponding to the specific LBA range 552 to the namespace 51-2, based on the use/non-use information 41 of the specific LBA range 552. In the host 2, for example, there is no overhead in which a use/non-use state of each LBA in the namespace 51-2 is confirmed and data is written by using the use/non-use information 41. Therefore, according to a second embodiment, for example, in a case where data is migrated to the namespace 51-2 of the storage drive 3 from another namespace, a processing amount in the host 2 can be reduced.

Third Embodiment

A storage system 1 according to a third embodiment is a system for migrating data from the storage drive 3 according to the first embodiment to the storage drive 3 according to the second embodiment.

Figure 9:
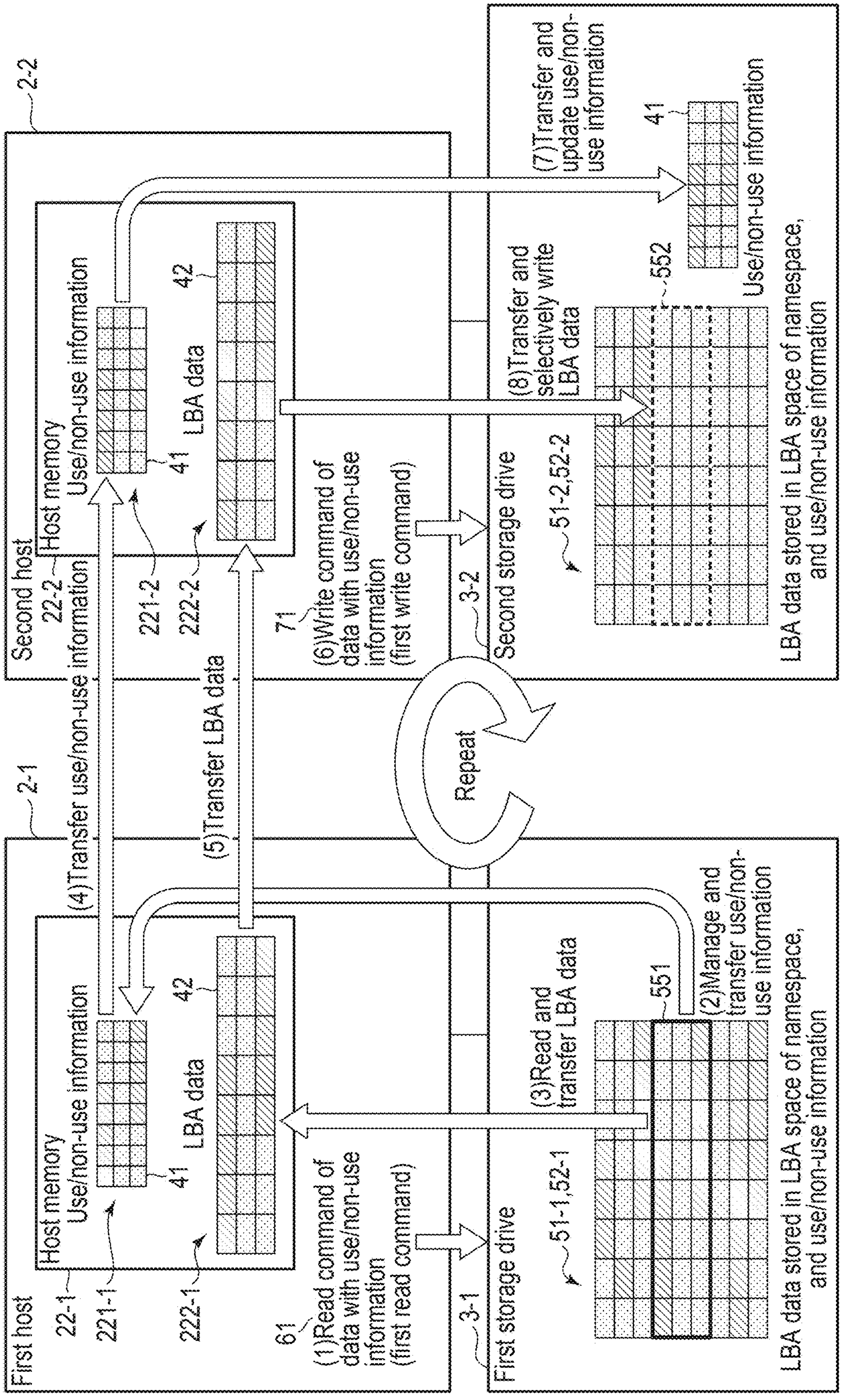
FIG. 9 is a diagram illustrating an example of data migration between namespaces in a storage system according to a third embodiment.

FIG. 9 illustrates an example of data migration between namespaces in the storage system 1 of the third embodiment. The storage system 1 includes a first storage drive 3-1, a first host 2-1, a second host 2-2, and a second storage drive 3-2. The first storage drive 3-1 is connected to the first host 2-1. The second storage drive 3-2 is connected to the second host 2-2. In addition, the first host 2-1 is connected to the second host 2-2. As an example, an interface for connecting the first host 2-1 and the second host 2-2 conforms to a standard such as Ethernet.

A configuration of the first storage drive 3-1 is similar to that of the storage drive 3 of the first embodiment. That is, the first storage drive 3-1 is a storage drive having the first read function of data with use/non-use information.

A configuration of the first host 2-1 is similar to that of the host 2 of the first embodiment. That is, the first host 2-1 is a host that issues the read command of data with use/non-use information (first read command) 61 to the first storage drive 3-1.

A configuration of the second storage drive 3-2 is similar to that of the storage drive 3 of the second embodiment. That is, the second storage drive 3-2 is a storage drive having the first write function of data with use/non-use information.

A configuration of the second host 2-2 is similar to that of the host 2 of the second embodiment. That is, the second host 2-2 is a host that issues the write command of data with use/non-use information (first write command) 71 to the second storage drive 3-2.

An example of a specific operation in the storage system 1 will be described.

The first host 2-1 allocates a storage area of a host memory 22-1 as a first buffer 221-1 for storing the use/non-use information 41 and a second buffer 222-1 for storing the LBA data 42. Then, the first host 2-1 issues the first read command 61 to the first storage drive 3-1 ((1) in FIG. 9).

In response to receiving the first read command 61 from the first host 2-1, the first storage drive 3-1 performs the read operation of data with use/non-use information ((2) and (3) in FIG. 9). The specific procedure of the read operation of data with use/non-use information is as described above with reference to FIG. 6 in the first embodiment. As a result, the LBA data 42 is read from a namespace 51-1 of the first storage drive 3-1, and the use/non-use information 41 and the LBA data 42 are transferred to the host memory 22-1 of the first host 2-1.

Next, the first host 2-1 transfers the use/non-use information 41 and the LBA data 42 from the host memory 22-1 to a host memory 22-2 of the second host 2-2 ((4) and (5) in FIG. 9). For data transfer between the first host 2-1 and the second host 2-2, any method may be selected from various methods for transferring data between information processing apparatuses. A storage area of the host memory 22-2 is allocated as a first buffer 221-2 for storing the use/non-use information 41 and a second buffer 222-2 for storing the LBA data 42.

In response to completion of the transfer of the use/non-use information 41 and the LBA data 42 to the host memory 22-2, the second host 2-2 issues a first write command 71 to the second storage drive 3-2 ((6) in FIG. 9).

In response to receiving the first write command 71 from the second host 2-2, the second storage drive 3-2 performs the write operation of data with use/non-use information ((7) and (8) in FIG. 9). The specific procedure of the write operation of data with use/non-use information is as described above with reference to FIG. 8 in the second embodiment. As a result, the use/non-use information 41 and the LBA data 42 are transferred from the host memory 22-2 of the second host 2-2 to the second storage drive 3-2, and the LBA data 42 is written to the namespace 51-2 on the basis of the use/non-use information 41. In addition, use/non-use information 52-2 managed by the second storage drive 3-2 is updated by using the use/non-use information 41.

In the storage system 1, the procedure from (1) to (8) is repeatedly performed until processes on all LBAs of the namespace 51-1 of the first storage drive 3-1 are completed.

As a result, the storage system 1 according to the third embodiment can achieve the following effects.

(1) Since the use/non-use information 52-1 corresponding to the migration source namespace 51-1 is reflected in the use/non-use information 52-2 of the migration destination namespace 51-2, the GC efficiency in the second storage drive 3-2 does not deteriorate compared with the first means of the comparative example (data migration not using use/non-use information).

(2) Since both the first host 2-1 and the second host 2-2 perform the data migration between namespaces without performing a determination process using the use/non-use information 41, processing amounts (overhead) in the first host 2-1 and the second host 2-2 can be greatly reduced compared with the third means of the comparative example (data migration using use/non-use information managed by a storage drive).

Fourth Embodiment

The storage drive 3 according to the first embodiment provides the host 2 with LBA data corresponding to a specific LBA range and use/non-use information of the specific LBA range.

In contrast, a storage drive 3 according to a fourth embodiment provides a host 2 with LBA data corresponding to an allocated LBA (or allocated LBAs) in a specific LBA range and use/non-use information of the specific LBA range. That is, the storage drive 3 of the fourth embodiment is configured to provide only valid data corresponding to the allocated LBA to the host 2 and not to provide data corresponding to a deallocated LBA to the host 2. The storage drive 3 of the fourth embodiment corresponds to a storage drive 3 that includes a migration source namespace.

A configuration of a storage system 1 that includes the storage drive 3 of the fourth embodiment is similar to the configuration of the storage system 1 that includes the storage drive 3 of the first embodiment. More specifically, configurations of the host 2 and the storage drive 3 according to the fourth embodiment are similar to the configurations of the host 2 and the storage drive 3 described above with reference to FIG. 5. The storage drive 3 of the fourth embodiment is different from the storage drive 3 of the first embodiment in terms of a process for providing only valid data corresponding to an allocated LBA to the host 2. Hereinafter, the difference from the first embodiment will be mainly described.

When the command reception/response unit 320 has received a specific read command from the host 2, the data read/transfer unit 321 transfers, to the host memory 22, valid data corresponding to an allocated LBA (or allocated LBAs) in an LBA range that is designated by the read command. Specifically, in a case where the designated LBA range includes an allocated LBA, the data read/transfer unit 321 reads, from the storage medium 31, valid data stored in the allocated LBA. The data read/transfer unit 321 transfers the read valid data to a storage area in the host memory 22 that corresponds to the allocated LBA. In contrast, in a case where the designated LBA range includes a deallocated LBA, the data read/transfer unit 321 does not perform an operation of reading and transferring data related to the deallocated LBA. Note that the specific read command is, for example, the read command of data with use/non-use information 61 (first read command 61).

Figure 10:
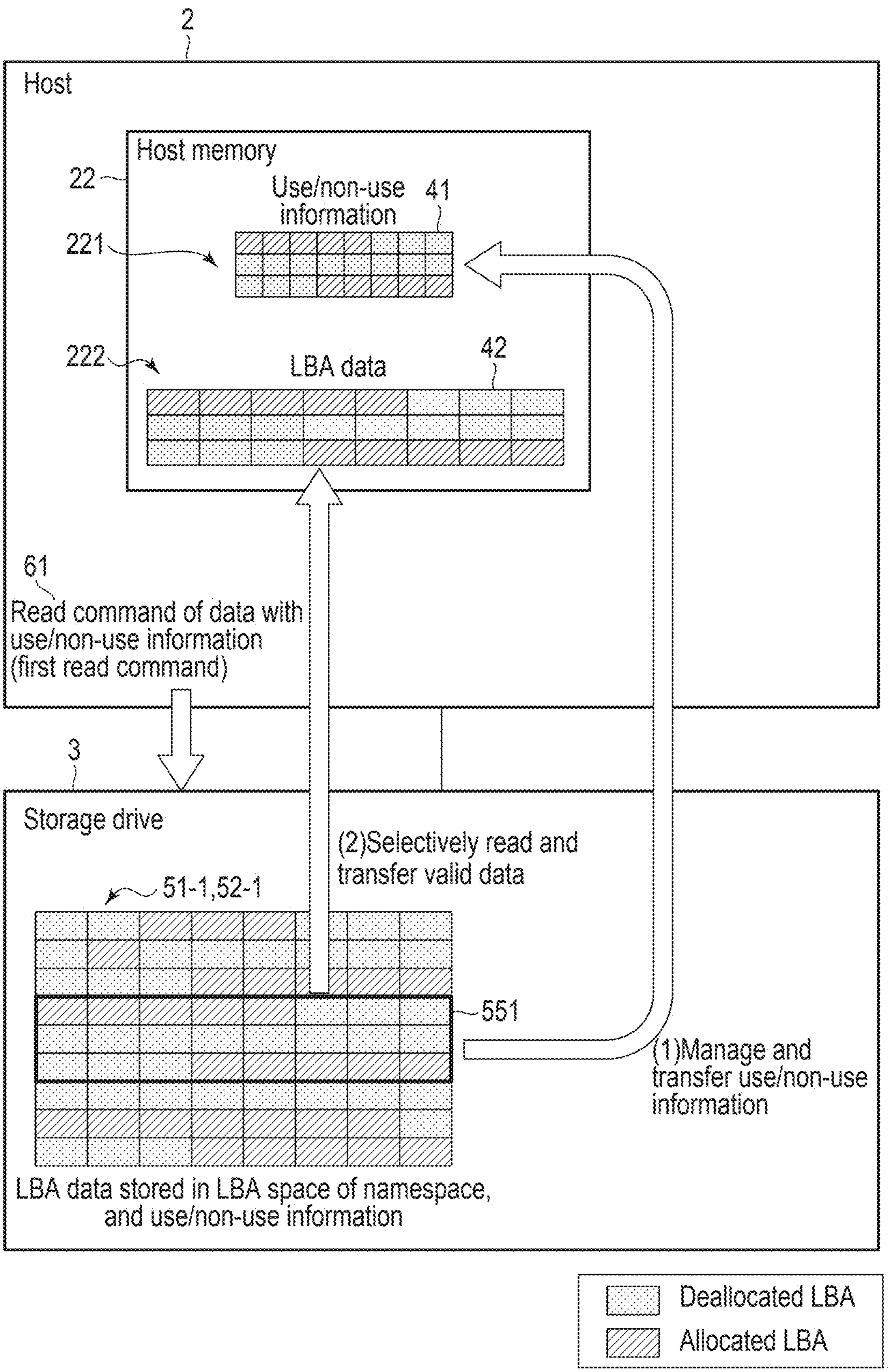
FIG. 10 is a diagram illustrating an example of a read operation of data with use/non-use information, in a storage system that includes a storage drive according to a fourth embodiment.

FIG. 10 illustrates an example of a read operation of data with use/non-use information, in the storage system 1 that includes the storage drive 3 of the fourth embodiment. The storage drive 3 of the fourth embodiment has a second read function of data with use/non-use information. The second read function of data with use/non-use information is a function of, in response to a first read command 61 being received from the host 2, providing the host 2 with valid data that corresponds to an allocated LBA (or allocated LBAs) in an LBA range designated by the first read command 61 and use/non-use information of the designated LBA range.

Here, a case where the host 2 uses the namespace 51-1 of the storage drive 3 will be exemplified. The information management/transfer unit 322 of the storage drive 3 manages use/non-use information 52-1 indicative of a use/non-use state of each LBA of the namespace 51-1. In FIG. 10, each of pieces of LBA data stored in an LBA space of the namespace 51-1 is illustrated with hatching that represents a use/non-use state of a corresponding LBA in the namespace 51-1.

FIG. 10 illustrates a case where an LBA range 551 is designated by the first read command 61. In this case, use/non-use information 41 corresponding to the LBA range 551 is to be stored in the first buffer 221 in the host memory 22. Further, pieces of LBA data 42 corresponding to the LBA range 551 are to be stored in the second buffer 222 in the host memory 22. Note that among the pieces of stored LBA data 42, only pieces of valid data that correspond to allocated LBAs are data read from the storage drive 3 (more specifically, the storage medium 31) and transferred to the host memory 22.

Similarly to the first embodiment, the first read command 61 designates: (a) a start LBA and an LBA size; and (b) a first buffer address indicative of the first buffer 221 in the host memory 22 in which the use/non-use information 41 is to be stored and a second buffer address indicative of the second buffer 222 in the host memory 22 in which the LBA data 42 is to be stored.

In the controller 32 of the storage drive 3, the command reception/response unit 320 receives the first read command 61 from the host 2. When the command reception/response unit 320 has received the first read command 61, following operations are performed in the storage drive 3.

(1) The information management/transfer unit 322 transfers, in the managed use/non-use information 52-1, the use/non-use information 41 that corresponds to the LBA range (first LBA range) 551 designated by the first read command 61, to the first buffer 221 in the host memory 22 based on the first buffer address.

(2) The data read/transfer unit 321 transfers one or more pieces of valid data that correspond to one or more allocated LBAs in the first LBA range 551, respectively, to the second buffer 222 in the host memory 22 based on the second buffer address, by using the use/non-use information 41.

The procedure of (2) will be specifically described. First, the data read/transfer unit 321 acquires the one or more pieces of valid data that correspond to the one or more allocated LBAs in the first LBA range 551, respectively, by using the use/non-use information 41. That is, the data read/transfer unit 321 reads the one or more pieces of valid data that are stored in the one or more allocated LBAs, respectively, from the storage medium 31. Based on a relative position of each of the allocated LBAs from the start of the first LBA range 551 and the second buffer address, the data read/transfer unit 321 transfers a corresponding piece of valid data to the second buffer 222. The second buffer 222 includes a plurality of storage areas starting from the second buffer address. Each of the plurality of storage areas has a size in which data logically stored in one LBA can be stored. For example, in a case where the i-th LBA of the first LBA range 551 is an allocated LBA, the data read/transfer unit 321 transfers a piece of valid data that corresponds to the allocated LBA to the i-th storage area among the plurality of storage areas included in the second buffer 222. Here, i is an integer from one to the LBA size.

Note that the data read/transfer unit 321 does not acquire data corresponding to a deallocated LBA in the first LBA range 551. Therefore, data corresponding to the deallocated LBA is not transferred to the second buffer 222. For example, in a case where the j-th LBA of the first LBA range 551 is a deallocated LBA, the data read/transfer unit 321 does not acquire data stored in the j-th LBA and does not transfer any data to the j-th storage area among the plurality of storage areas included in the second buffer 222. Here, j is an integer from one to the LBA size. In the host 2, for example, data of a predetermined value such as “FF” or “00” stored in the j-th storage area among the plurality of storage areas included in the second buffer 222 may be handled as data stored in the j-th deallocated LBA of the first LBA range 551.

In the storage drive 3, the procedure of (1) and (2) is repeatedly performed until processes on all LBAs of the namespace 51-1 are completed.

With the above configuration, in response to the first read command 61, the storage drive 3 can provide the host 2 with the valid data corresponding to the allocated LBAs in the designated LBA range 551 and the use/non-use information 41 of the designated LBA range 551. In the host 2, for example, there is no overhead in which a use/non-use state of each LBA in the namespace 51-1 is confirmed and data is read by using the use/non-use information 41. Therefore, for example, in a case where data is migrated from the namespace 51-1 of the storage drive 3 to another namespace, a processing amount in the host 2 can be reduced. In addition, since only the valid data corresponding to the allocated LBAs is transferred from the storage drive 3 to the host memory 22, for example, an amount of data transferred from the storage drive 3 to the host memory 22 can be reduced compared with that in the storage drive 3 of the first embodiment.

Fifth Embodiment

The storage drive 3 according to the second embodiment writes LBA data corresponding to a specific LBA range to an LBA space (namespace), based on use/non-use information of the specific LBA range.

In contrast, a storage drive 3 according to a fifth embodiment transfers valid data corresponding to an allocated LBA (or allocated LBAs) in a specific LBA range transferred from a host 2 and writes the valid data to an LBA space (namespace), based on use/non-use information of the specific LBA range. That is, the storage drive 3 of the fifth embodiment is configured to transfer only the valid data corresponding to the allocated LBA from the host 2 and not to transfer data corresponding to a deallocated LBA from the host 2. The storage drive 3 of the fifth embodiment corresponds to a storage drive 3 that includes a migration destination namespace.

A configuration of a storage system 1 that includes the storage drive 3 of the fifth embodiment is similar to the configuration of the storage system 1 that includes the storage drive 3 of the second embodiment. More specifically, configurations of the host 2 and the storage drive 3 are similar to the configurations of the host 2 and the storage drive 3 described above with reference to FIG. 7. The storage drive 3 of the fifth embodiment is different from the storage drive 3 of the second embodiment in terms of a process for transferring only valid data corresponding to an allocated LBA from the host 2. Hereinafter, the difference from the second embodiment will be mainly described.

When the command reception/response unit 320 has received a specific write command from the host 2, the information management/transfer unit 322 transfers use/non-use information 41 from a host memory 22 of the host 2, based on an address designated by the received write command. The specific write command is the write command of data with use/non-use information (first write command) 71.

By using the use/non-use information 41 transferred by the information management/transfer unit 322, the data transfer/write unit 323 transfers valid data that corresponds to an allocated LBA (or allocated LBAs) in an LBA range designated by the received write command (that is, valid data of LBA data 42), from the host memory 22. The data transfer/write unit 323 writes the transferred LBA data 42 to a storage medium 31 of the storage drive 3. On the other hand, the data transfer/write unit 323 does not transfer data that corresponds to a deallocated LBA in the LBA range designated by the write command, from the host memory 22. Therefore, the data corresponding to the deallocated LBA is not written to the storage medium 31.

Figure 11:
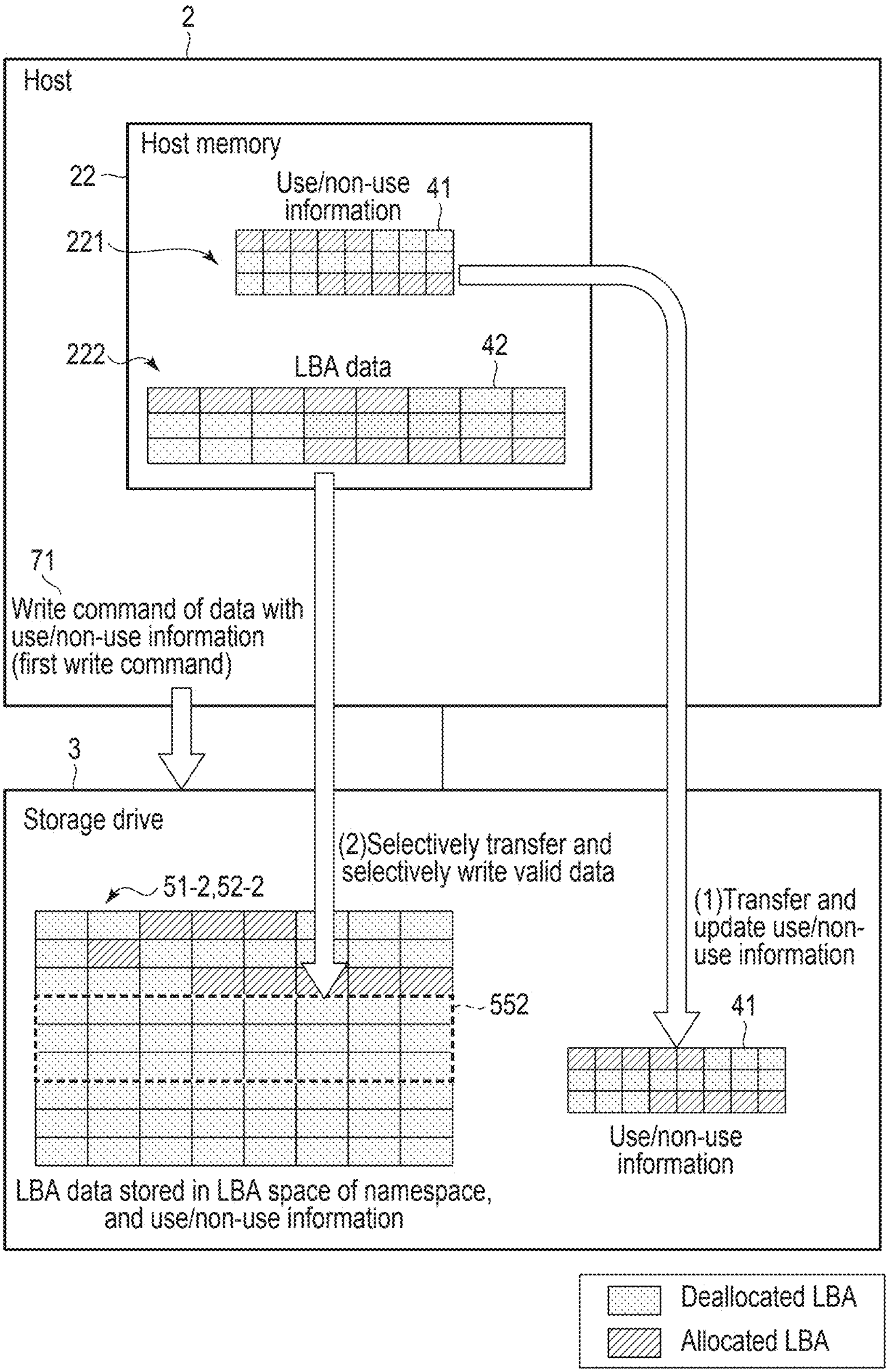
FIG. 11 is a diagram illustrating an example of a write operation of data with use/non-use information, in a storage system that includes a storage drive according to a fifth embodiment.

FIG. 11 illustrates an example of a write operation of data with use/non-use information, in the storage system 1 that includes the storage drive 3 of the fifth embodiment. The storage drive 3 of the fifth embodiment has a second write function of data with use/non-use information. The second write function of data with use/non-use information is a function of, in response to receiving a first write command 71 from the host 2, transferring valid data corresponding to an allocated LBA (or allocated LBAs) in an LBA range designated by the first write command 71 and writing the transferred valid data to an LBA space (namespace) on the basis of use/non-use information of the designated LBA range.

Here, a case where the host 2 uses a namespace 51-2 of the storage drive 3 will be exemplified. The information management/transfer unit 322 of the storage drive 3 manages use/non-use information 52-2 indicative of a use/non-use state of each LBA of the namespace 51-2. In FIG. 11, each of pieces of LBA data stored in an LBA space of the namespace 51-2 is illustrated with hatching that represents a use/non-use state of a corresponding LBA in the namespace 51-2.

FIG. 11 illustrates a case where an LBA range 552 is designated by the first write command 71. In this case, the use/non-use information 52-2 corresponding to the LBA range 552 is replaced with the use/non-use information 41 transferred from the host memory 22. Valid data transferred to the storage drive 3 in the LBA data 42 stored in the host memory 22 is written to the LBA range 552.

Similarly to the second embodiment, the first write command 71 designates: (a) a start LBA and an LBA size; and (b) a first buffer address indicative of the first buffer 221 in the host memory 22 in which the use/non-use information 41 is stored and a second buffer address indicative of the second buffer 222 in the host memory 22 in which the LBA data 42 is stored.

In the controller 32 of the storage drive 3, the command reception/response unit 320 receives the first write command 71 from the host 2. When the command reception/response unit 320 has received the first write command 71, following operations are performed in the storage drive 3.

(1) The information management/transfer unit 322 transfers the use/non-use information 41 from the first buffer 221 in the host memory 22 based on the first buffer address. The information management/transfer unit 322 updates, in the managed use/non-use information 52-2, use/non-use information that corresponds to the LBA range (second LBA range) 552 designated by the first write command 71 with the transferred use/non-use information 41.

(2) The data transfer/write unit 323 transfers one or more pieces of valid data that correspond to one or more allocated LBAs in the second LBA range 552, respectively, among the pieces of LBA data 42 stored in the second buffer 222 in the host memory 22, based on the use/non-use information 41 and the second buffer address. The data transfer/write unit 323 writes the transferred one or more pieces of valid data to the storage medium 31.

The procedure of (2) will be specifically described. First, the data transfer/write unit 323 identifies the one or more allocated LBAs in the second LBA range 552 by using the use/non-use information 41. Based on a relative position of each of the allocated LBAs from the start of the second LBA range 552 and the second buffer address, the data transfer/write unit 323 transfers a corresponding piece of valid data from the second buffer 222. The second buffer 222 includes a plurality of storage areas starting from the second buffer address. Each of the plurality of storage areas has a size in which data logically stored in one LBA can be stored. For example, in a case where the i-th LBA of the second LBA range 552 is an allocated LBA, the data transfer/write unit 323 transfers a piece of valid data that corresponds to the allocated LBA from the i-th storage area among the plurality of storage areas included in the second buffer 222. In the namespace 51-2, the data transfer/write unit 323 writes the transferred piece of valid data that corresponds to each of the allocated LBAs to the storage medium 31. That is, the data transfer/write unit 323 writes the transferred piece of valid data to the storage medium 31 and associates the transferred piece of valid data with a corresponding allocated LBA in the namespace 51-2.

Note that the data transfer/write unit 323 does not transfer a piece of data corresponding to a deallocated LBA in the second LBA range 552 from the second buffer 222. Therefore, the piece of data corresponding to the deallocated LBA is not written to the storage medium 31. For example, in a case where the j-th LBA of the second LBA range 552 is a deallocated LBA, the data transfer/write unit 323 does not transfer a piece of data from the j-th storage area among the plurality of storage areas included in the second buffer 222.

In the storage drive 3, the procedure of (1) and (2) is repeatedly performed until processes on all LBAs of the namespace 51-2 are completed.

With the above configuration, in response to the first write command 71, the storage drive 3 can transfer the valid data corresponding to the allocated LBAs in the specific second LBA range 552 transferred from the host 2 and write the valid data to the namespace 51-2, based on the use/non-use information 41 of the specific second LBA range 552. In the host 2, for example, there is no overhead in which a use/non-use state of each LBA of the namespace 51-2 and data is written by using the use/non-use information 41. Therefore, for example, in a case where data is migrated to the namespace 51-2 of the storage drive 3 from another namespace, a processing amount in the host 2 can be reduce. In addition, since only the valid data corresponding to the allocated LBAs is transferred from the host memory 22 to the storage drive 3, for example, an amount of data transferred from the host memory 22 to the storage drive 3 can be reduced compared with that in the storage drive 3 of the second embodiment.

Sixth Embodiment

A storage system 1 according to a sixth embodiment is a system for migrating data from the storage drive 3 according to the fourth embodiment to the storage drive 3 according to the second embodiment.

The storage system 1 of the sixth embodiment has a configuration in which the first storage drive 3-1 is replaced from the storage drive 3 of the first embodiment to the storage drive 3 of the fourth embodiment in the storage system 1 of the third embodiment described above with reference to FIG. 9. That is, in the storage system 1 of the sixth embodiment, the first storage drive 3-1 is a storage drive having the second read function of data with use/non-use information.

In the storage system 1 of the sixth embodiment, in addition to the effects by the storage system 1 of the third embodiment, the effect by the storage drive 3 of the fourth embodiment can also be achieved. That is, since only valid data corresponding to allocated LBAs is transferred from the first storage drive 3-1 to the host memory 22-1, for example, an amount of data transferred from the first storage drive 3-1 to the host memory 22-1 can be reduced compared with that in the storage system 1 of the third embodiment.

Seventh Embodiment

A storage system 1 according to the seventh embodiment is a system for migrating data from the storage drive 3 according to the first embodiment to the storage drive 3 according to the fifth embodiment.

The storage system 1 of the seventh embodiment has a configuration in which the second storage drive 3-2 is replaced from the storage drive 3 of the second embodiment to the storage drive 3 of the fifth embodiment in the storage system 1 of the third embodiment described above with reference to FIG. 9. That is, in the storage system 1 of the seventh embodiment, the second storage drive 3-2 is a storage drive having the second write function of data with use/non-use information.

In the storage system 1 of the seventh embodiment, in addition to the effects of the storage system 1 of the third embodiment, the effect of the storage drive 3 of the fifth embodiment can also be achieved. That is, since only valid data corresponding to allocated LBAs is transferred from the host memory 22-2 to the second storage drive 3-2, for example, an amount of data transferred from the host memory 22-2 to the second storage drive 3-2 can be reduced compared with that in the storage system 1 of the third embodiment.

Eighth Embodiment

A storage system 1 according to an eighth embodiment is a system for migrating data from the storage drive 3 according to the fourth embodiment to the storage drive 3 according to the fifth embodiment.

The storage system 1 of the eighth embodiment has a configuration in which the first storage drive 3-1 is replaced from the storage drive 3 of the first embodiment to the storage drive 3 of the fourth embodiment and the second storage drive 3-2 is replaced from the storage drive 3 of the second embodiment to the storage drive 3 of the fifth embodiment in the storage system 1 of the third embodiment described above with reference to FIG. 9. That is, in the storage system 1 of the eighth embodiment, the first storage drive 3-1 is a storage drive having the second read function of data with use/non-use information, and the second storage drive 3-2 is a storage drive having the second write function of data with use/non-use information.

In the storage system 1 of the eighth embodiment, in addition to the effects of the storage system 1 of the third embodiment, the effect of the storage drive 3 of the fourth embodiment and the effect of the storage drive 3 of the fifth embodiment can also be achieved. That is, since only valid data corresponding to allocated LBAs is transferred from the first storage drive 3-1 to the host memory 22-1, for example, an amount of data transferred from the first storage drive 3-1 to the host memory 22-1 can be reduced compared with that in the storage system 1 of the third embodiment. Furthermore, since only valid data corresponding to allocated LBAs is transferred from the host memory 22-2 to the second storage drive 3-2, for example, an amount of data transferred from the host memory 22-2 to the second storage drive 3-2 can be reduced compared with that in the storage system 1 of the third embodiment.

Ninth Embodiment

The storage drive 3 according to the first embodiment provides the host 2 with LBA data corresponding to a specific LBA range and the use/non-use information 41 of the specific LBA range. In addition, the storage drive 3 according to the fourth embodiment provides the host 2 with valid data corresponding to allocated LBAs in a specific LBA range and the use/non-use information 41 of the specific LBA range.

In contrast, a storage drive 3 according to a ninth embodiment provides a host 2 with pieces of valid data that correspond to allocated LBAs in a specific LBA range and are limited to a specific maximum number of LBAs as an upper limit, and provides the host 2 with use/non-use information and header information that correspond to the provided valid data. The pieces of valid data provided to the host 2 and limited to the specific maximum number of LBAs is also referred to as shrink data. The header information includes information for identifying an LBA range that corresponds to the shrink data provided to the host 2. That is, the storage drive 3 of the ninth embodiment is configured to provide the host 2 with valid data (shrink data) corresponding to allocated LBAs whose number is limited to the specific maximum number of LBAs, and not to provide the host 2 with valid data exceeding a data amount that corresponds to the specific maximum number of LBAs even if the not provided valid data corresponds to an allocated LBA in the specific LBA range. The storage drive 3 of the ninth embodiment corresponds to the storage drive 3 that includes a migration source namespace.

A configuration of a storage system that includes the storage drive 3 of the ninth embodiment is similar to the configuration of the storage system 1 that includes the storage drive 3 of the first embodiment and the fourth embodiment. The storage drive 3 of the ninth embodiment is different from the storage drive 3 of the first embodiment and the fourth embodiment in terms of a process for providing the host 2 with shrink data. Hereinafter, the difference from the first embodiment and the fourth embodiment will be mainly described.

Figure 12:
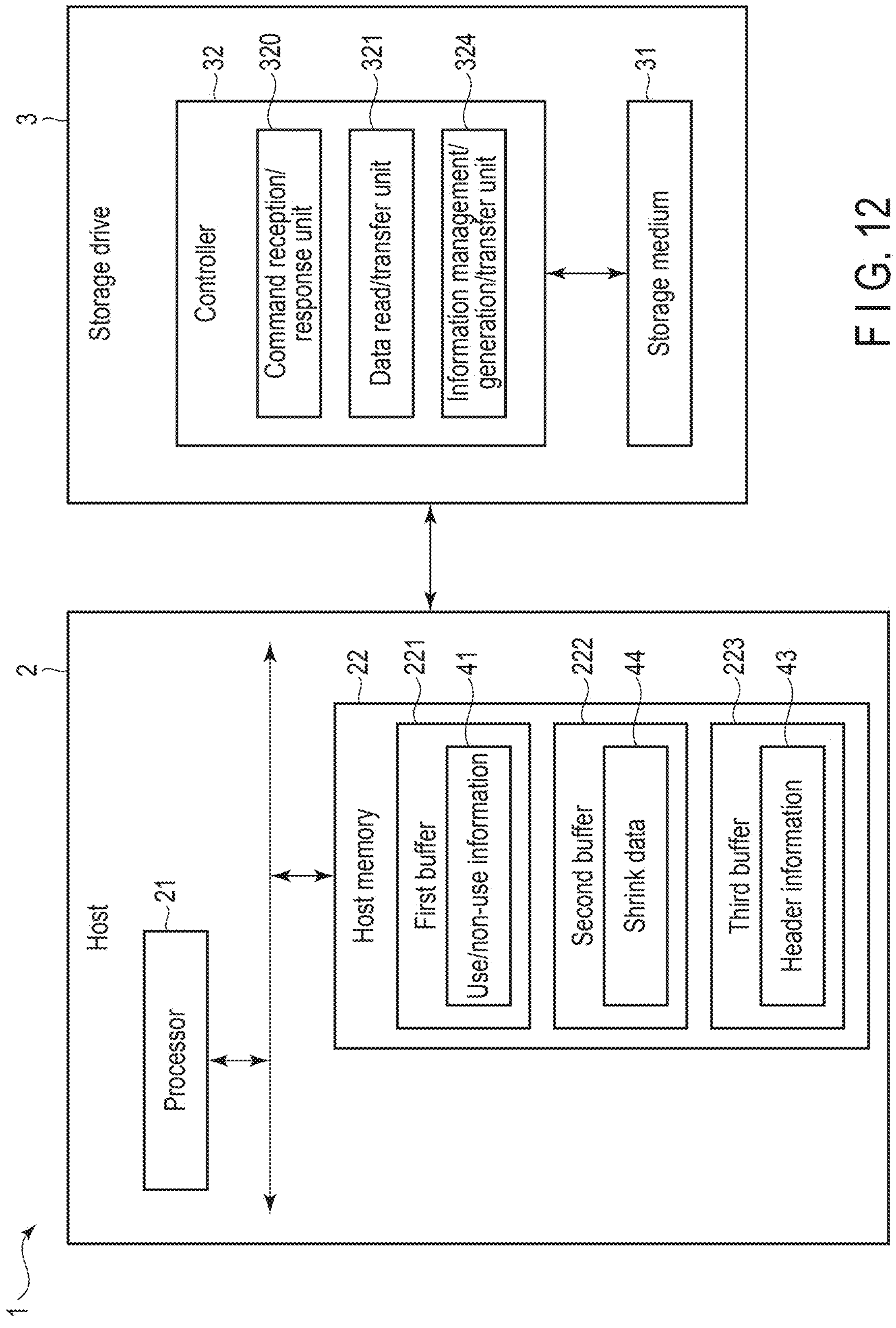
FIG. 12 is a block diagram illustrating a configuration example of a storage system that includes a storage drive according to a ninth embodiment.

FIG. 12 is a block diagram illustrating a configuration example of the storage system 1 that includes the storage drive 3 of the ninth embodiment. The storage system 1 includes the host 2 and the storage drive 3.

A configuration of the host 2 is similar to the configuration of the host 2 described above with reference to FIG. 5 except for allocation of a storage area of a host memory 22. The storage area of the host memory 22 is allocated as, for example, the first buffer 221, the second buffer 222, and a third buffer 223. The first buffer 221 is a buffer area of use/non-use information 41. The second buffer 222 is a buffer area of shrink data 44. The third buffer 223 is a buffer area of header information 43.

A configuration of the storage drive 3 is similar to the configuration of the storage drive 3 described above with reference to FIG. 5 except for functions of a controller 32. The controller 32 functions as, in addition to the command reception/response unit 320 and the data read/transfer unit 321, an information management/generation/transfer unit 324.

The command reception/response unit 320 receives a command issued by the host 2. The command reception/response unit 320 causes the data read/transfer unit 321 and the information management/generation/transfer unit 324 to perform a process in accordance with the received command. In addition, the command reception/response unit 320 returns, to the host 2, a response indicative of completion of the process in accordance with the received command.

The information management/generation/transfer unit 324 manages use/non-use information corresponding to an LBA space. When the command reception/response unit 320 has received a specific read command from the host 2, the information management/generation/transfer unit 324 acquires use/non-use information of an LBA range designated by the read command and generates header information. The specific read command is a read command of shrink data with use/non-use information (hereinafter, also referred to as a second read command). The information management/generation/transfer unit 324 transfers the acquired use/non-use information and the generated header information to the host memory 22.

When the command reception/response unit 320 has received the specific read command (for example, the second read command) from the host 2, the data read/transfer unit 321 transfers, to the host memory 22, valid data corresponding to an allocated LBA (or allocated LBAs) in the LBA range designated by the read command with the maximum number of LBAs designated by the read command as the upper limit.

Figure 13:
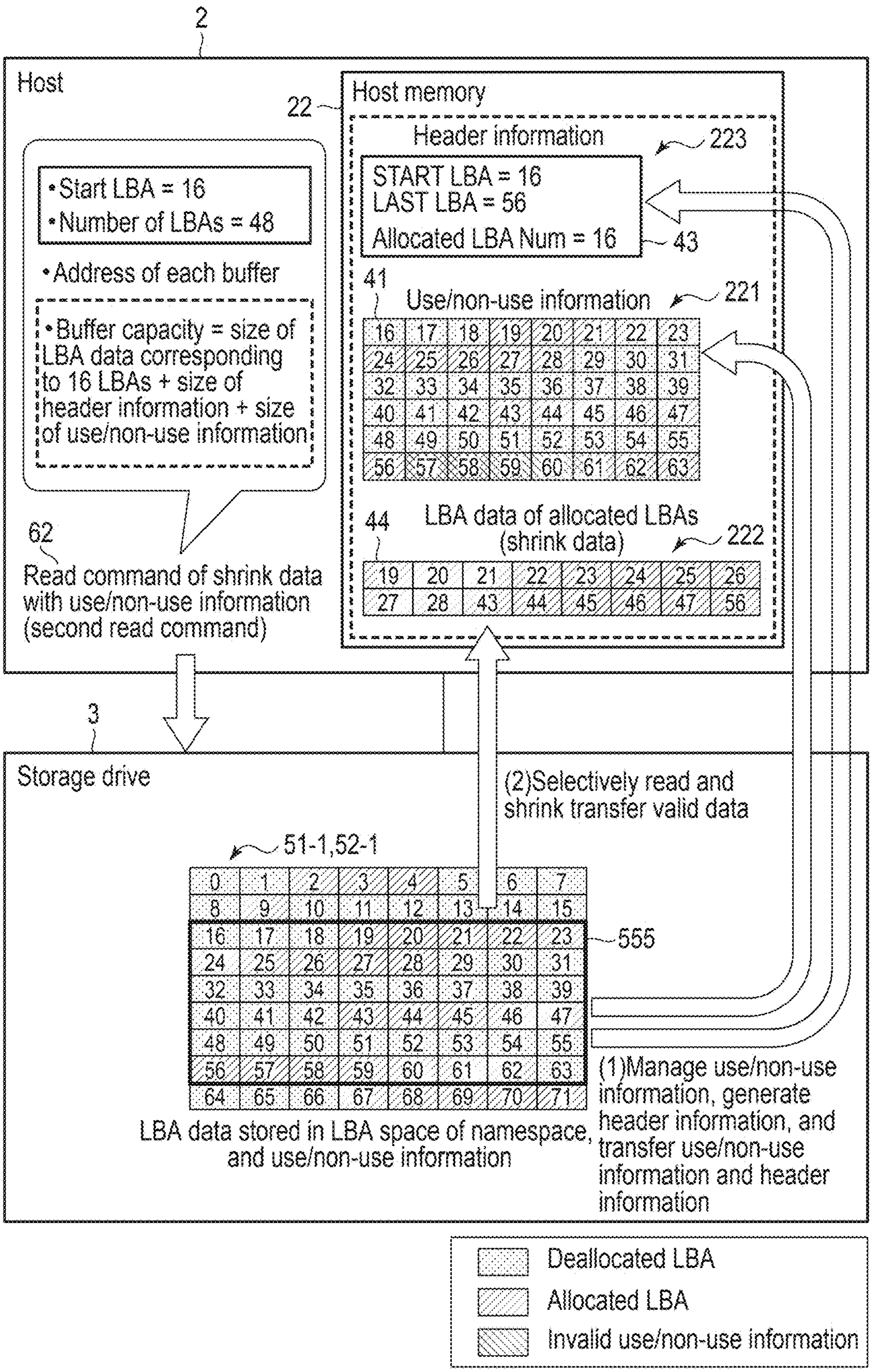
FIG. 13 is a diagram illustrating an example of a read operation of data with use/non-use information, in the storage system that includes the storage drive according to the ninth embodiment.

FIG. 13 illustrates an example of a read operation of data with use/non-use information in the storage system 1 that includes the storage drive 3 of the ninth embodiment. The storage drive 3 of the ninth embodiment has a read function of shrink data with use/non-use information. The read function of shrink data with use/non-use information is a function of, in response to receiving a second read command 62 from the host 2, providing the host 2 with one or more pieces of valid data that correspond to one or more allocated LBAs in an LBA range designated by the second read command 62 and are limited to the maximum number of LBAs designated by the second read command 62 as the upper limit, and providing the host 2 with use/non-use information and header information that correspond to the pieces of valid data.

Here, a case where the host 2 uses a namespace 51-1 of the storage drive 3 will be exemplified. The information management/generation/transfer unit 324 of the storage drive 3 manages use/non-use information 52-1 indicative of a use/non-use state of each LBA of the namespace 51-1. In FIG. 13, each of pieces of LBA data stored in an LBA space of the namespace 51-1 is illustrated with hatching that represents a use/non-use state of a corresponding LBA in the namespace 51-1.

The second read command 62 designates: (a) a start LBA and an LBA size (the number of LBAs); (b) a first buffer address indicative of the first buffer 221 in the host memory 22 in which use/non-use information 41 is to be stored, a second buffer address indicative of the second buffer 222 in the host memory 22 in which shrink data 44 is to be stored, and a third buffer address indicative of the third buffer 223 in the host memory 22 in which header information 43 is to be stored; and (c) information by which the maximum number of LBAs is identifiable.

By the start LBA and the LBA size being designated in the second read command 62, an LBA range (hereinafter, also referred to as a first LBA range) 555 corresponding to LBA data to be acquired is identified.

The first buffer 221 has a size in which the use/non-use information 41 provided by the storage drive 3 in accordance with the second read command 62 can be stored.

The second buffer 222 has a size in which the shrink data 44 provided by the storage drive 3 in accordance with the second read command 62 can be stored. More specifically, the second buffer 222 includes as many storage areas as the maximum number of LBAs designated by the second read command 62. Each of the maximum number of storage areas has a size in which data logically stored in one LBA can be stored. In the storage drive 3, in response to the second read command 62, one or more pieces of valid data whose number is limited to the maximum number of LBAs as the upper limit are sequentially acquired among pieces of valid data that correspond to all allocated LBAs in the first LBA range 555 in order from the start of the first LBA range 555. The acquired one or more pieces of valid data are sequentially stored in one or more storage areas from the head of the maximum number of storage areas of the second buffer 222. The second buffer 222 does not include any storage area for data corresponding to a deallocated LBA.

The third buffer 223 has a size in which the header information 43 provided by the storage drive 3 in accordance with the second read command 62 can be stored. The third buffer address is, for example, an address indicative of the start of the third buffer 223.

The information by which the maximum number of LBAs is identifiable indicates, for example, the sum of the size of the first buffer 221, the size of the second buffer 222, and the size of the third buffer 223 (that is, a buffer capacity). In this case, the storage drive 3 subtracts the sizes of the use/non-use information 41 and the header information 43 to be transferred to the host 2 from the buffer capacity, thereby obtaining the size of the second buffer 222. The storage drive 3 then divides the size of the second buffer 222 by the size of data logically stored in one LBA, thereby acquiring an upper limit of the number of allocated LBAs (that is, the maximum number of LBAs) corresponding to valid data to be transferred to the second buffer 222. Alternatively, the information by which the maximum number of LBAs is identifiable may indicate an upper limit of the number of allocated LBAs corresponding to valid data to be transferred to the second buffer 222 as it is.

In the example of the second read command 62 illustrated in FIG. 13, the start LBA is set to 16, the number of LBAs is set to 48, and the information indicative of the maximum number of LBAs is set to the buffer capacity. That is, in the second read command 62, an LBA range that includes 48 LBAs from LBA 16 to LBA 63 is designated. The buffer capacity indicates the sum of the size of LBA data corresponding to 16 LBAs (the size of the second buffer 222), the size of the header information 43 (the size of the third buffer 223), and the size of the use/non-use information 41 (the size of the first buffer 221). That is, in the second read command 62, the buffer capacity by which the maximum number of LBAs is identifiable as 16 is designated.

In the controller 32 of the storage drive 3, the command reception/response unit 320 receives the second read command 62 from the host 2. When the command reception/response unit 320 has received the second read command 62, following operations are performed in the storage drive 3.

(1) The information management/generation/transfer unit 324 acquires, in the managed use/non-use information 52-1, use/non-use information 41 that corresponds to the LBA range (first LBA range) 555 designated by the second read command 62, and generates header information 43.

The header information 43 includes, for example, START LBA, LAST LBA, and allocated LBA Num (the number of allocated LBAs). The information management/generation/transfer unit 324 sets the start LBA designated by the second read command 62 as the START LBA. The information management/generation/transfer unit 324 determines whether or not a total number M of allocated LBAs in the first LBA range 555 is equal to or smaller than the maximum number of LBAs by using the acquired use/non-use information 41, and depending on the determination result, determines the LAST LBA and the allocated LBA Num.

Specifically, in a case where M is equal to or smaller than the maximum number of LBAs, the information management/generation/transfer unit 324 sets the end LBA of the first LBA range 555 as the LAST LBA. Then, the information management/generation/transfer unit 324 sets M as the allocated LBA Num.

On the other hand, in a case where M exceeds the maximum number of LBAs, the information management/generation/transfer unit 324 identifies the first allocated LBA at which a number obtained by counting pieces of valid data stored in the allocated LBAs in the first LBA range 555 in order from the head exceeds the maximum number of LBAs. The information management/generation/transfer unit 324 sets an LBA that is one-LBA before the identified allocated LBA as the LAST LBA. Further, the information management/generation/transfer unit 324 sets the maximum number of LBAs as the allocated LBA Num.

In the example illustrated in FIG. 13, as the START LBA, 16 (=start LBA) is set. As the LAST LBA, 56 is set. Specifically, the information management/generation/transfer unit 324 determines that the total number M of allocated LBAs (=22) in the LBA range 555 from LBA 16 to LBA 63 exceeds the maximum number of LBAs (=16). When sequentially acquiring pieces of valid data corresponding to the allocated LBAs in the LBA range 555 in order from the head, the information management/generation/transfer unit 324 identifies that the first allocated LBA exceeding the maximum number of LBAs is 57. The information management/generation/transfer unit 324 sets 56 which is one-LBA before the identified allocated LBA as the LAST LBA. Further, as the allocated LBA Num, 16 (=the maximum number of LBAs) is set.

The information management/generation/transfer unit 324 transfers the acquired use/non-use information 41 to the first buffer 221 in the host memory 22 based on the first buffer address. Note that in the use/non-use information 41, use/non-use information corresponding to LBAs after the LAST LBA is handled as invalid use/non-use information. The use/non-use information corresponding to the LBAs after the LAST LBA may be deleted from the use/non-use information 41. Alternatively, the use/non-use information 41 may be transferred to the first buffer 221 as it is.

Further, the information management/generation/transfer unit 324 transfers the generated header information 43 to the third buffer 223 in the host memory 22 based on the third buffer address.

(2) By using the use/non-use information corresponding to the first LBA range 555, the data read/transfer unit 321 identifies the allocated LBA Num of allocated LBAs that are included in an range from the START LBA to the LAST LBA in the first LBA range 555. The data read/transfer unit 321 acquires the allocated LBA Num of pieces of valid data that correspond to the identified allocated LBA Num of allocated LBAs, respectively. That is, the data read/transfer unit 321 reads, from the storage medium 31, the allocated LBA Num of pieces of valid data that are stored in the allocated LBA Num of allocated LBAs, respectively. As described above, in the case where the total number M of allocated LBAs in the first LBA range 555 is equal to or smaller than the maximum number of LBAs, the allocated LBA Num is M. In the case where the total number M of the allocated LBAs in the second LBA range exceeds the maximum number of LBAs, the allocated LBA Num is the maximum number of LBAS.

The data read/transfer unit 321 transfers the acquired allocated LBA Num of pieces of valid data to the second buffer 222 in the host memory 22 based on the second buffer address. The second buffer 222 includes as many storage areas as the maximum number of LBAs, and the storage areas start from the second buffer address. Each of the maximum number of the storage areas has a size in which data logically stored in one LBA can be stored. The transferred allocated LBA Num of pieces of valid data are sequentially stored in the allocated LBA Num of storage areas from the head of the maximum number of the storage areas in the second buffer 222. The second buffer 222 stores only valid data corresponding to the allocated LBA, and does not store any data corresponding to the deallocated LBA. Therefore, the second buffer 222 stores shrink data 44 into which only the pieces of valid data corresponding to the allocated LBAs is packed.

In the storage drive 3, the procedure of (1) and (2) is repeatedly performed until processes on all LBAs of the namespace 51-1 are completed.

FIG. 13 illustrates the case where the second read command 62 designates the LBA range (first LBA range) 555 from LBA 16 to LBA 63. In this case, the first buffer 221 in the host memory 22 stores the use/non-use information 41 corresponding to the first LBA range 555. Note that in the use/non-use information 41, use/non-use information corresponding to each of LBAs from LBA 57 to LBA 63 after the LAST LBA (=56) is handled as invalid use/non-use information. In the use/non-use information 41 of FIG. 13, the invalid use/non-use information is represented with hatching different from that of the use/non-use information corresponding to the allocated LBA and the deallocated LBA. The third buffer 223 in the host memory 22 stores the header information 43 related to the shrink data 44 read in accordance with the second read command 62. The second buffer 222 in the host memory 22 stores as many pieces of valid data as the maximum number of LBAs (here, 16) from the head of the pieces of valid data corresponding to the allocated LBAs in the first LBA range 555. Here, the shrink data 44 including 16 pieces of valid data that correspond to 16 allocated LBAs, respectively, is stored in the second buffer 222.

With the above configuration, in response to the second read command 62, the storage drive 3 can provide the host 2 with the pieces of valid data that correspond to the allocated LBAs in the designated first LBA range 555 and whose number is limited to the designated maximum number of LBAs as the upper limit, and can provide the host 2 with the use/non-use information 41 and the header information 43 that correspond to the provided pieces of valid data. In the host 2, for example, there is no overhead in which a use/non-use state of each LBA in the namespace 51-1 is confirmed and data is read by using the use/non-use information 41. Therefore, for example, in a case where data is migrated from the namespace 51-1 of the storage drive 3 to another namespace, a processing amount in the host 2 can be reduced.

In addition, the storage drive 3 restricts the capacity of the host memory 22 included in the host 2 and transfers data from the storage drive 3 to the host memory 22 so that only valid data corresponding to allocated LBAs is stored in the host memory 22. Therefore, in most cases, the storage drive 3 of the ninth embodiment can reduce the number of repetitions of the operation for data transfer compared with the storage drives 3 of the first and fourth embodiments. Note that, if most of the namespace 51-1 is occupied by allocated LBAs, the efficiency is reduced as generation and transfer of the header information 43 is added. However, such a case is considered to be very rare.

Tenth Embodiment

The storage drive 3 according to the ninth embodiment provides the host 2 with pieces of valid data that correspond to allocated LBAs in a specific LBA range and whose number is limited to a specific maximum number of LBAs as the upper limit (that is, provides the host 2 with the shrink data 44), and provides the host 2 with the use/non-use information 41 and the header information 43 that correspond to the provided pieces of valid data. That is, the storage drive 3 of the ninth embodiment corresponds to a storage drive 3 including a migration source namespace from which the shrink data 44 is read.

In contrast, a storage drive 3 according to a tenth embodiment writes shrink data 44 transferred from a host 2 to an LBA space (namespace), based on use/non-use information 41 and header information 43 that are transferred from the host 2. That is, the storage drive 3 of the tenth embodiment corresponds to a storage drive 3 including a migration destination namespace to which the shrink data 44 is written.

A configuration of a storage system that includes the storage drive 3 of the tenth embodiment is similar to the configuration of the storage system 1 that includes the storage drive 3 of the ninth embodiment. The tenth embodiment is different from the ninth embodiment in terms of a process for migrating data to a migration destination namespace. Hereinafter, the difference from the ninth embodiment will be mainly described.

Figure 14:
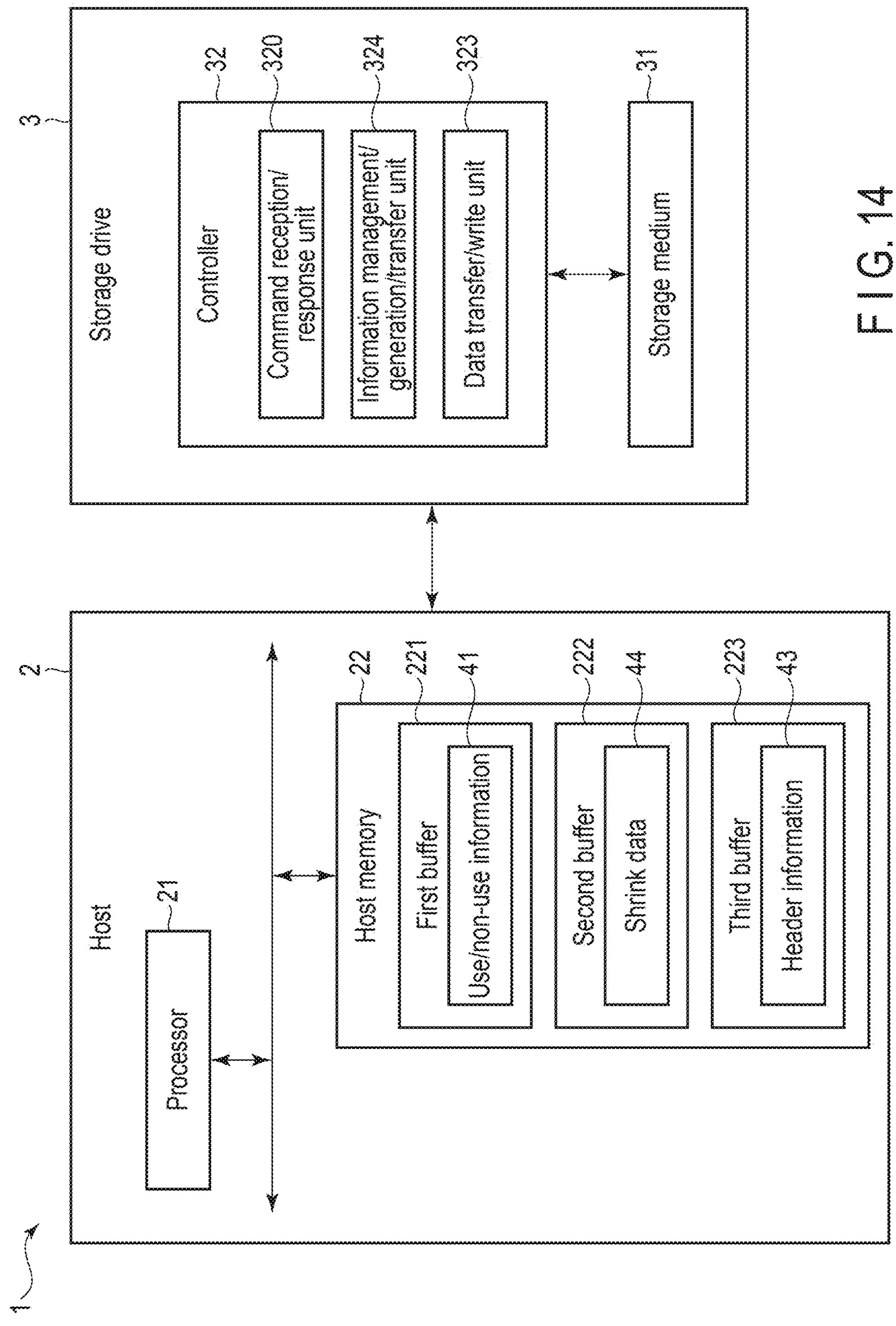
FIG. 14 is a block diagram illustrating a configuration example of a storage system that includes a storage drive according to a tenth embodiment.

FIG. 14 is a block diagram illustrating a configuration example of the storage system 1 that includes the storage drive 3 of the tenth embodiment. The storage system 1 includes the host 2 and the storage drive 3.

A configuration of the host 2 is similar to the configuration of the host 2 described above with reference to FIG. 12. A storage area of the host memory 22 of the host 2 is allocated as, for example, the first buffer 221, the second buffer 222, and the third buffer 223. Hereinafter, it is assumed that use/non-use information 41, shrink data 44, and header information 43 are stored in the first buffer 221, the second buffer 222, and the third buffer 223, respectively.

A configuration of the storage drive 3 is similar to the configuration of the storage drive 3 described above with reference to FIG. 12 except for functions of the controller 32. The controller 32 functions as, in addition to the command reception/response unit 320 and the information management/generation/transfer unit 324, the data transfer/write unit 323. The controller 32 may function as the data read/transfer unit 321.

The command reception/response unit 320 receives a command issued by the host 2. The command reception/response unit 320 causes the information management/generation/transfer unit 324 and the data transfer/write unit 323 to perform a process in accordance with the received command. In addition, the command reception/response unit 320 returns, to the host 2, a response indicative of completion of the process in accordance with the received command.

The information management/generation/transfer unit 324 manages use/non-use information corresponding to an LBA space. When the command reception/response unit 320 has received a specific write command from the host 2, the information management/generation/transfer unit 324 transfers the use/non-use information 41 and the header information 43 from the host memory 22, based on addresses designated by the received write command. The specific write command is a write command of shrink data with use/non-use information (hereinafter, also referred to as a second write command). The information management/generation/transfer unit 324 updates the managed use/non-use information by using the transferred use/non-use information 41.

When the command reception/response unit 320 has received the specific write command (for example, the second write command) from the host 2, the data transfer/write unit 323 transfers the shrink data 44 from the host memory 22, based on an address designated by the received write command. The data transfer/write unit 323 writes the shrink data 44 to an allocated LBA (or allocated LBAs) in the LBA space (namespace), based on the use/non-use information 41 and the header information 43 transferred by the information management/generation/transfer unit 324.

Figure 15:
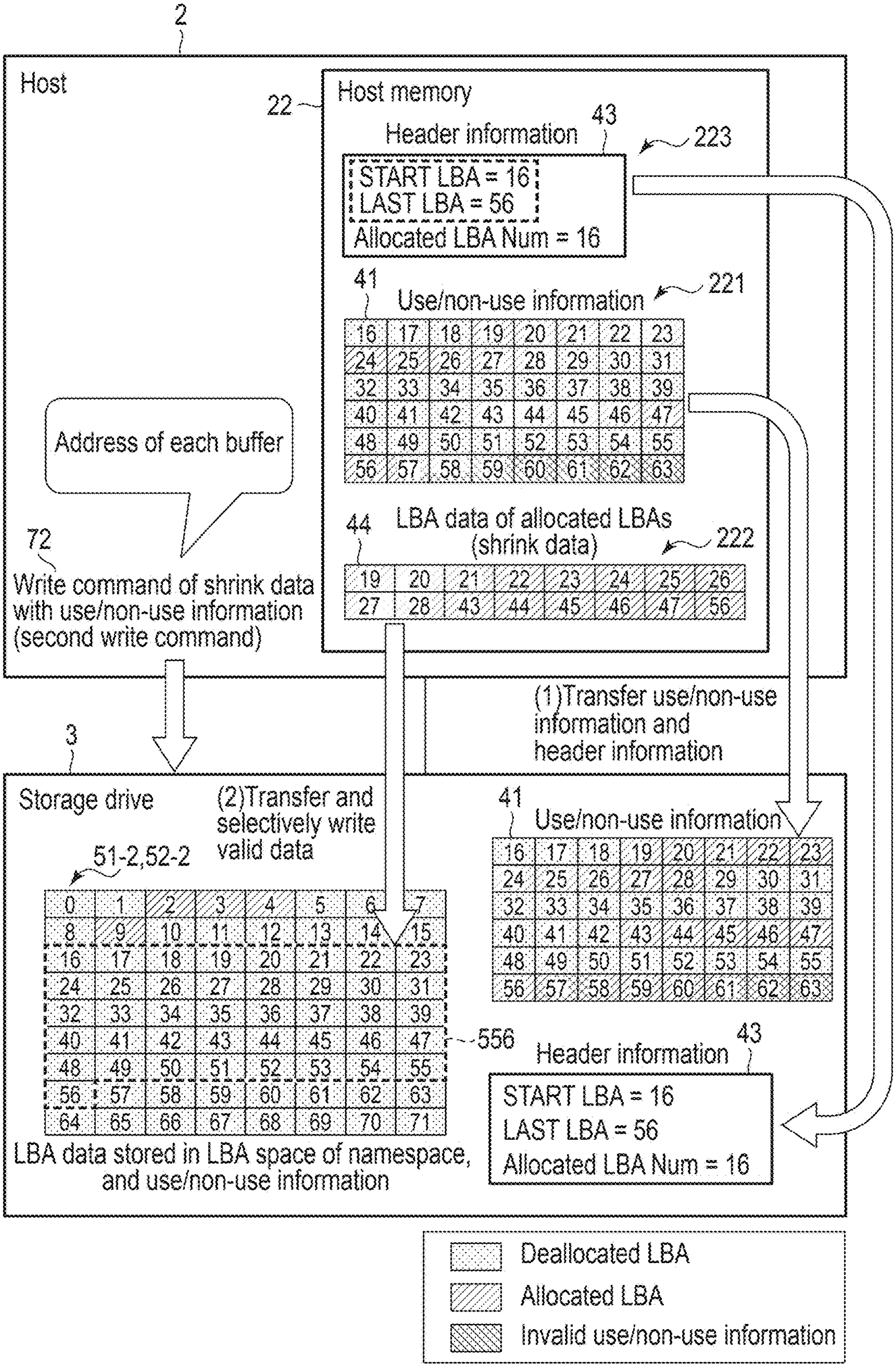
FIG. 15 is a diagram illustrating an example of a write operation of data with use/non-use information, in the storage system that includes the storage drive according to the tenth embodiment.

FIG. 15 illustrates an example of a write operation of data with use/non-use information in the storage system 1 that includes the storage drive 3 of the tenth embodiment. The storage drive 3 of the tenth embodiment has a write function of shrink data with use/non-use information. The write function of shrink data with use/non-use information is a function of, in response to receiving a second write command 72 from the host 2, writing the shrink data 44 transferred from the host 2 to the LBA space (namespace), based on the use/non-use information 41 and the header information 43 transferred from the host 2.

Here, a case where the host 2 uses a namespace 51-2 of the storage drive 3 will be exemplified. The information management/generation/transfer unit 324 of the storage drive 3 manages use/non-use information 52-2 indicative of a use/non-use state of each LBA of the namespace 51-2. In FIG. 15, each of pieces of LBA data stored in an LBA space of the namespace 51-2 is illustrated with hatching that represents a use/non-use state of a corresponding LBA in the namespace 51-2.

The second write command 72 designates a first buffer address indicative of the first buffer 221 in the host memory 22 in which the use/non-use information 41 is to be stored, a second buffer address indicative of the second buffer 222 in the host memory 22 in which the shrink data 44 is to be stored, and a third buffer address indicative of the third buffer 223 in the host memory 22 in which the header information 43 is to be stored.

The first buffer 221 stores the use/non-use information 41 that is provided to the storage drive 3 in accordance with the second write command 72.

The second buffer 222 stores the shrink data 44 that is provided to the storage drive 3 in accordance with the second write command 72. The shrink data 44 includes a first number of pieces of valid data (N pieces of valid data) that correspond to N allocated LBAs, respectively. N corresponds to allocated LBA Num indicated in the header information 43. The second buffer 222 includes as many storage areas as the maximum number of LBAs that is equal to or larger than N. Each of the maximum number of the storage areas has a size in which data logically stored in one LBA can be stored. In a case where the shrink data 44 is provided in accordance with the second write command 72, the N pieces of valid data included in the shrink data 44 are sequentially stored in N storage areas from the head of the maximum number of the storage areas in the second buffer 222. The second buffer 222 does not include a storage area for data corresponding to the deallocated LBA.

The third buffer 223 stores the header information 43 that is provided to the storage drive 3 in accordance with the second write command 72.

In the controller 32 of the storage drive 3, the command reception/response unit 320 receives the second write command 72 from the host 2. When the command reception/response unit 320 has received the second write command 72, following operations are performed in the storage drive 3.

(1) The information management/generation/transfer unit 324 transfers the use/non-use information 41 from the first buffer 221 in the host memory 22 based on the first buffer address. The information management/generation/transfer unit 324 transfers the header information 43 from the third buffer 223 in the host memory 22 based on the third buffer address. Based on START LBA and LAST LBA included in the header information 43, the information management/generation/transfer unit 324 identifies an LBA range (hereinafter, second LBA range) 556 from the START LBA to the LAST LBA. The information management/generation/transfer unit 324 updates, in the managed use/non-use information 52-2, use/non-use information corresponding to the second LBA range 556 with the use/non-use information 41.

(2) The data transfer/write unit 323 transfers the shrink data 44 from the second buffer 222 in the host memory 22 based on the second buffer address. The data transfer/write unit 323 writes the transferred shrink data 44 to the storage medium 31.

The procedure of (2) will be specifically described. The shrink data 44 includes the N pieces of valid data that correspond to the N allocated LBAs, respectively. Each of the N pieces of valid data is data to be stored in a corresponding allocated LBA. The data transfer/write unit 323 transfers the N pieces of valid data from the N storage areas from the head of the second buffer 222, respectively. The data transfer/write unit 323 identifies an allocated LBA in the second LBA range 556 in order from the head, based on the use/non-use information 41. Every time the allocated LBA is identified, the data transfer/write unit 323 selects a piece of valid data among the transferred N pieces of valid data in order from the head. For example, in a case where a i-th allocated LBA of the second LBA range 556 is identified, the data transfer/write unit 323 selects i-th valid data among the N pieces of valid data. The data transfer/write unit 323 writes the selected piece of valid data to the identified allocated LBA in the namespace 51-2. That is, the data transfer/write unit 323 writes the selected piece of valid data to the storage medium 31 and associates the selected piece of valid data with the corresponding allocated LBA in the namespace 51-2.

In the storage drive 3, the procedure of (1) and (2) is repeatedly performed until processes on all LBAs of the namespace 51-2 are completed.

FIG. 15 illustrates a case where the second LBA range 556 from LBA 16 to LBA 56 is identified based on the START LBA and the LAST LBA in the header information 43. Since the allocated LBA Num in the header information 43 is 16, the shrink data 44 includes 16 pieces of valid data that are to be stored in 16 allocated LBAs, respectively.

In this case, the use/non-use information 52-2 corresponding to the second LBA range 556 is replaced with the use/non-use information 41 (more specifically, the use/non-use information 41 from LBA 16 to LBA 56) transferred from the host memory 22. In 16 allocated LBAs in the second LBA range 556, that are indicated by the use/non-use information 41, the 16 pieces of valid data included in the shrink data 44 are stored, respectively.

With the above configuration, in response to the second write command 72, the storage drive 3 can write the shrink data 44 to the namespace 51-2, based on the use/non-use information 41 and the header information 43. In the host 2, for example, there is no overhead in which a use/non-use state of each LBA of the namespace 51-2 is confirmed and data is written by using the use/non-use information 41. Therefore, for example, in a case where data is migrated to the namespace 51-2 of the storage drive 3 from another namespace, a processing amount in the host 2 can be reduced.

In addition, the storage drive 3 restricts a capacity of the host memory 22 included in the host 2 and transfers data from the host memory 22 to the storage drive 3 so that only valid data corresponding to allocated LBAs is stored in the storage medium 31. Therefore, in most cases, the storage drive 3 of the tenth embodiment can reduce the number of repetitions of the operation for data transfer compared with the storage drives 3 of the second and fifth embodiments. Note that, if most of the namespace 51-2 is occupied by allocated LBAs, the efficiency is reduced as generation and transfer of the header information 43 is added. However, such a case is considered to be very rare.

Eleventh Embodiment

A storage system 1 according to an eleventh embodiment is a system for migrating data from the storage drive 3 according to the ninth embodiment to the storage drive 3 according to the tenth embodiment.

Figure 16:
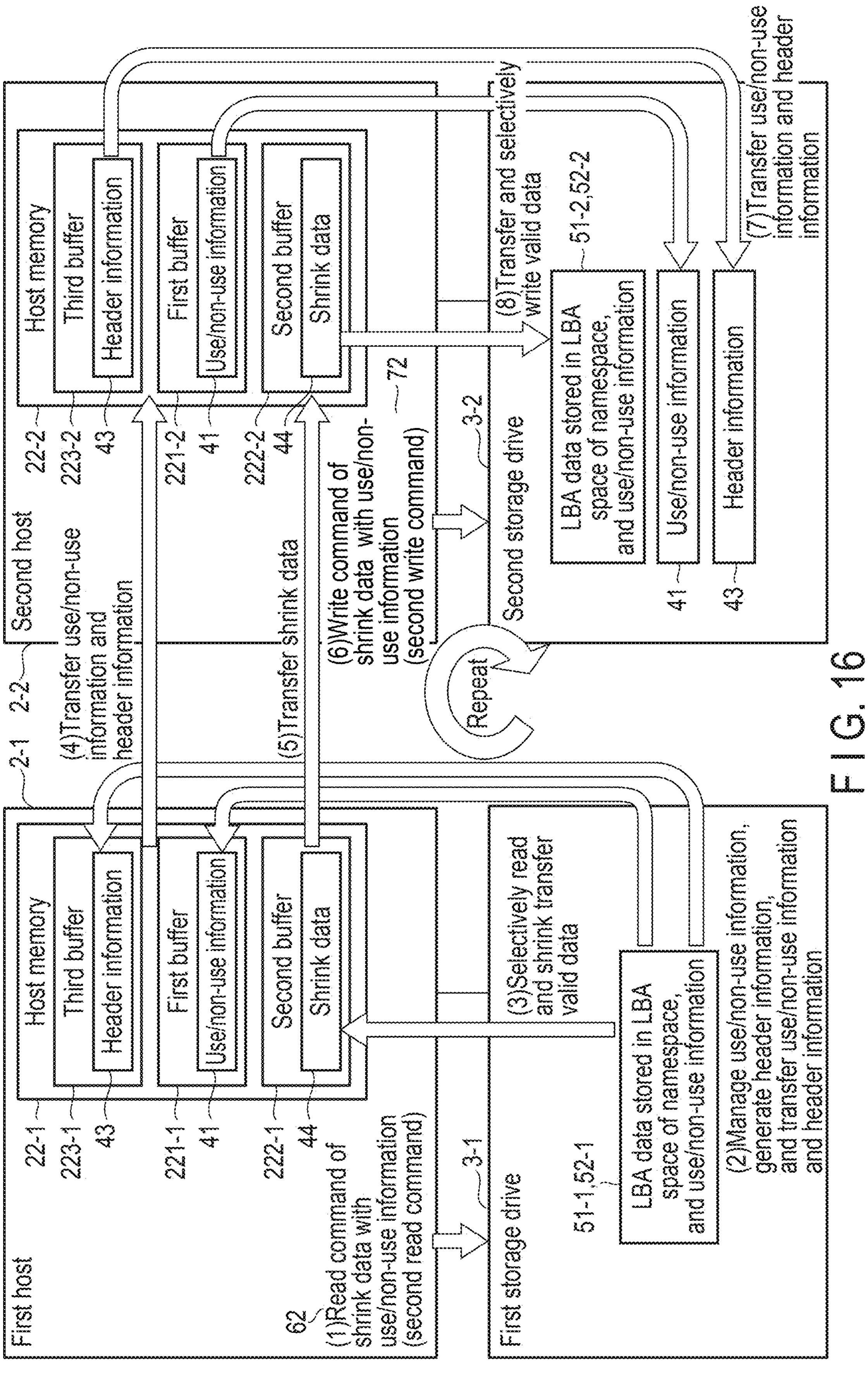
FIG. 16 is a diagram illustrating an example of data migration between namespaces in a storage system according to an eleventh embodiment.

FIG. 16 illustrates an example of data migration between namespaces in the storage system 1 of the eleventh embodiment. The storage system 1 includes a first storage drive 3-1, a first host 2-1, a second host 2-2, and a second storage drive 3-2. The first storage drive 3-1 is connected to the first host 2-1. The second storage drive 3-2 is connected to the second host 2-2. In addition, the first host 2-1 is connected to the second host 2-2. As an example, an interface for connecting the first host 2-1 and the second host 2-2 conforms to a standard such as Ethernet.

A configuration of the first storage drive 3-1 is similar to that of the storage drive 3 of the ninth embodiment. That is, the first storage drive 3-1 is a storage drive having the read function of shrink data with use/non-use information.

A configuration of the first host 2-1 is similar to that of the host 2 of the ninth embodiment. That is, the first host 2-1 is a host that issues the read command of shrink data with use/non-use information (second read command) 62 to the first storage drive 3-1.

A configuration of the second storage drive 3-2 is similar to that of the storage drive 3 of the tenth embodiment. That is, the second storage drive 3-2 is a storage drive having the write function of shrink data with use/non-use information.

A configuration of the second host 2-2 is similar to that of the host 2 of the tenth embodiment. That is, the second host 2-2 is a host that issues the write command of shrink data with use/non-use information (second write command) 72 to the second storage drive 3-2.

An example of a specific operation in the storage system 1 will be described.

The first host 2-1 allocates a storage area of a host memory 22-1 as a first buffer 221-1 that stores use/non-use information 41, a second buffer 222-1 that stores shrink data 44, and a third buffer 223-1 that stores header information 43. Then, the first host 2-1 issues the second read command 62 to the first storage drive 3-1 ((1) in FIG. 16).

In response to receiving the second read command 62 from the first host 2-1, the first storage drive 3-1 performs the read operation of data with use/non-use information ((2) and (3) in FIG. 16). The specific procedure of the read operation of data with use/non-use information is as described above with reference to FIG. 13 in the ninth embodiment. As a result, the shrink data 44 is read from the namespace 51-1 of the first storage drive 3-1, and the use/non-use information 41, the header information 43, and the shrink data 44 are transferred to the host memory 22-1 of the first host 2-1.

Next, the first host 2-1 transfers the use/non-use information 41, the header information 43, and the shrink data 44 from the host memory 22-1 to a host memory 22-2 of the second host 2-2 ((4) and (5) in FIG. 16). A storage area of the host memory 22-2 is allocated as a first buffer 221-2 that stores the use/non-use information 41, a second buffer 222-2 that stores the shrink data 44, and a third buffer 223-2 that stores the header information 43. For data transfer between the first host 2-1 and the second host 2-2, any method may be selected from various methods for transferring data between information processing apparatuses.

In response to completion of the transfer of the use/non-use information 41, the header information 43, and the shrink data 44 to the host memory 22-2, the second host 2-2 issues the second write command 72 to the second storage drive 3-2 ((6) in FIG. 16).

In response to receiving the second write command 72 from the second host 2-2, the second storage drive 3-2 performs the write operation of data with use/non-use information ((7) and (8) in FIG. 16). The specific procedure of the write operation of data with use/non-use information is as described above with reference to FIG. 15 in the tenth embodiment. As a result, the use/non-use information 41, the header information 43, and the shrink data 44 are transferred from the host memory 22-2 of the second host 2-2 to the second storage drive 3-2, and the shrink data 44 is written to the namespace 51-2 on the basis of the use/non-use information 41 and the header information 43. In addition, use/non-use information 52-2 managed by the second storage drive 3-2 is updated by using the use/non-use information 41.

In the storage system 1, the procedure from (1) to (8) is repeatedly performed until processes on all LBAs of the namespace 51-1 of the first storage drive 3-1 are completed. Note that the first host 2-1 generates a next second read command 62 by using, for example, the header information 43 obtained through a previous read operation of data with use/non-use information that has been completed. Specifically, for example, the first host 2-1 sets an LBA next to the LAST LBA indicated in the header information 43 as a start LBA designated by the next second read command 62.

With the above-described configuration, the storage system 1 of the eleventh embodiment can achieve the following effects in addition to the effects achieved in the storage system 1 of the third embodiment and the sixth to eighth embodiments.

The first storage drive 3-1 restricts a capacity of the host memory 22-1 included in the first host 2-1 and transfers data from the first storage drive 3-1 to the host memory 22-1 so that only valid data corresponding to allocated LBAs is stored in the host memory 22-1. In addition, the second storage drive 3-2 restricts a capacity of the host memory 22-2 included in the second host 2-2 and transfers data to the second storage drive 3-2 from the host memory 22-2 so that only valid data corresponding to allocated LBAs is stored in the host memory 22-2.

Therefore, in most cases, the storage system 1 of the eleventh embodiment can reduce the number of repetitions of the operation for data transfer compared with the storage systems 1 of the third embodiment and the sixth to eighth embodiments. Note that, if most of the namespaces 51-1 and 51-2 are occupied by allocated LBAs, the efficiency is reduced as generation and transfer of the header information 43 is added. However, such a case is considered to be very rare.

As described above, according to the first to eleventh embodiments, a processing amount in the host 2 can be reduced.

The command reception/response unit 320 receives a read request that designates a first LBA range in a first LBA space (for example, the namespace 51-1) from a host 2. The information management/transfer unit 322 (or the information management/generation/transfer unit 324) transfers use/non-use information 41 indicating whether or not each of a plurality of LBAs included in the first LBA range is used by the host 2, to the host memory 22 included in the host 2. The data read/transfer unit 321 reads, from the storage medium 31, one or more pieces of valid data that are stored in one or more LBAs, respectively. The one or more LBAs are used by the host 2 among the plurality of LBAs. The data read/transfer unit 321 transfers, to the host memory 22, either a plurality of pieces of data or the one or more pieces of valid data. The plurality of pieces of data respectively correspond to the plurality of LBAs and include the one or more pieces of valid data.

As a result, in response to the read request, the storage drive 3 can provide the host 2 with data corresponding to the first LBA range and the use/non-use information of the first LBA range. In the host 2, for example, there is no overhead in which a use/non-use state of each LBA in a namespace is confirmed and data is read by using the use/non-use information 41. Therefore, for example, in a case where data is migrated from the namespace 51-1 in the storage drive 3 to another namespace, the storage drive 3 can reduce a processing amount in the host 2.

In addition, the command reception/response unit 320 receives a write request that designates a first LBA range in a first LBA space (for example, the namespace 51-2) from a host 2. The information management/transfer unit 322 (or the information management/generation/transfer unit 324) transfers use/non-use information 41 indicating whether each of a plurality of LBAs included in the first LBA range is used by the host 2, from a host memory 22 included in the host 2. The data transfer/write unit 323 transfers, from the host memory 22, either a plurality of pieces of data that correspond to the plurality of LBAs, respectively, or one or more pieces of valid data among the plurality of pieces of data. The data transfer/write unit 323 writes the plurality of pieces of data or the one or more pieces of valid data to the storage medium 31, based on the use/non-use information 41.

As a result, in response to the write request, the storage drive 3 can write at least the valid data corresponding to the first LBA range to the namespace 51-2, based on the use/non-use information 41. In the host 2, for example, there is no overhead in which a use/non-use state of each LBA in a namespace is confirmed and data is written by using the use/non-use information 41. Therefore, for example, in a case where data is migrated to the namespace 51-2 of the storage drive 3 from another namespace, the storage drive 3 can reduce a processing amount in the host 2.

Each of the various functions described in the first to eleventh embodiments may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiments may be realized in a processing circuit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A storage drive connectable to a host, the storage drive comprising:

a drive memory;

a storage medium; and a controller configured to:

manage a logical address space;

receive, from the host, a read request that designates a first logical address range in the logical address space;

in accordance with the read request, read, from the storage medium to the drive memory, one or more pieces of valid data stored in one or more logical addresses, respectively, the one or more logical addresses being used by the host among a plurality of logical addresses included in the first logical address range;

in accordance with the read request, transfer, from the drive memory to a host memory included in the host, first information indicating whether or not each of the plurality of logical addresses is used by the host; and in accordance with the read request, transfer, to the host memory, either a plurality of pieces of data or the one or more pieces of valid data, the plurality of pieces of data respectively corresponding to the plurality of logical addresses and including the one or more pieces of valid data, the host memory including a plurality of storage areas that respectively correspond to the plurality of logical addresses, the one or more pieces of valid data being transferred to one or more storage areas among the plurality of storage areas that respectively correspond to the one or more logical addresses, wherein the read request further designates information by which a maximum number of pieces of valid data to be read from the first logical address range is identifiable, the controller is configured to, in a case where the first logical address range stores a first number of pieces of valid data, the first number being equal to or smaller than the maximum number:

transfer, to the host memory, second information that includes a first address indicative of a start of the first logical address range, a second address indicative of an end of the first logical address range, and the first number;

transfer the first information to the host memory;

read the first number of pieces of valid data from the storage medium; and transfer the read first number of pieces of valid data to the host memory; and the controller is further configured to, in a case where the first logical address range stores a second number of pieces of valid data, the second number exceeding the maximum number:

transfer information that includes the first address, a third address that is one-logical address before a first logical address at which a number obtained by counting pieces of valid data stored in the first logical address range in order from a head exceeds the maximum number, and the maximum number, to the host memory as the second information;

transfer information indicating at least whether each of one or more logical addresses from the first address to the third address stores valid data, to the host memory as the first information;

read, from the storage medium, the maximum number of pieces of valid data in order from a head of the plurality of pieces of data that are stored in the plurality of logical addresses, respectively; and transfer the read maximum number of pieces of valid data to the host memory.

2. The storage drive according to claim 1, wherein a storage area of the host memory includes a first buffer capable of storing the first information and a second buffer capable of storing the plurality of pieces of data, the read request further designates a first buffer address indicative of the first buffer and a second buffer address indicative of the second buffer, and the controller is configured to:

transfer the first information to the first buffer based on the first buffer address; and transfer either the plurality of pieces of data or the one or more pieces of valid data to the second buffer based on the second buffer address.

3. The storage drive according to claim 2, wherein the second buffer includes the plurality of storage areas that correspond to the plurality of logical addresses, respectively, and the controller is further configured to, in a case where the plurality of pieces of data are transferred to the second buffer, transfer the plurality of pieces of data to the plurality of storage areas, respectively.

4. The storage drive according to claim 2, wherein the second buffer includes the plurality of storage areas that corresponds to the plurality of logical addresses, respectively, a first piece of valid data among the one or more pieces of valid data is data stored in an i-th logical address among the plurality of logical addresses, i being an integer from one to a number of the plurality of logical addresses, and the controller is further configured to, in a case where the one or more pieces of valid data are transferred to the second buffer, transfer the first piece of valid data to an i-th storage area among the plurality of storage areas.

5. The storage drive according to claim 1, wherein a storage area of the host memory includes a first buffer capable of storing the first information, a second buffer capable of storing the maximum number of pieces of data, and a third buffer capable of storing the second information, the read request further designates a first buffer address indicative of the first buffer, a second buffer address indicative of the second buffer, and a third buffer address indicative of the third buffer, and the controller is further configured to:

transfer the first information to the first buffer based on the first buffer address;

transfer either the first number of pieces of valid data or the maximum number of pieces of valid data to the second buffer based on the second buffer address; and transfer the second information to the third buffer based on the third buffer address.

6. The storage drive according to claim 5, wherein the second buffer includes the maximum number of storage areas, and the controller is further configured to:

in a case where the first number of pieces of valid data is transferred to the second buffer, transfer the first number of pieces of valid data to the first number of storage areas from a head of the maximum number of storage areas, respectively; and in a case where the maximum number of pieces of valid data is transferred to the second buffer, transfer the maximum number of pieces of valid data to the maximum number of storage areas, respectively.

7. A storage drive connectable to a host, the storage drive comprising:

a drive memory;

a storage medium; and a controller configured to:

manage a logical address space;

receive a write request from the host;

in accordance with the write request, transfer, from a host memory included in the host to the drive memory, first information indicating whether each of a plurality of logical addresses included in a first logical address range in the logical address space stores valid data;

in accordance with the write request, transfer, from the host memory to the drive memory, second information that includes a first address indicative of a start of the first logical address range, a second address indicative of an end of the first logical address range, and a first number of pieces of valid data stored in the first logical address range;

in accordance with the write request, transfer the first number of pieces of valid data from the host memory to the drive memory; and write the first number of pieces of valid data to the storage medium, based on the first information, wherein the controller is further configured to receive, from the host, a read request that designates a second logical address range in the logical address space and designates information by which a maximum number of pieces of valid data to be read from the second logical address range is identifiable;

the controller is further configured to, in a case where the second logical address range stores a second number of pieces of valid data, the second number being equal to or smaller than the maximum number:

transfer, to the host memory, third information that includes a third address indicative of a start of the second logical address range, a fourth address indicative of an end of the second logical address range, and the second number;

transfer, to the host memory, fourth information indicating whether or not each of a plurality of second logical addresses included in the second logical address range is used by the host;

read the second number of pieces of valid data from the storage medium; and transfer the read second number of pieces of valid data to the host memory; and the controller is further configured to, in a case where the second logical address range stores a third number of pieces of valid data, the third number exceeding the maximum number:

transfer information that includes the third address, a fifth address that is one-logical address before a first logical address at which a number obtained by counting pieces of valid data stored in the second logical address range in order from a head exceeds the maximum number, and the maximum number, to the host memory as the third information;

transfer information indicating at least whether or not each of one or more logical addresses from the third address to the fifth address stores valid data, to the host memory as the fourth information;

read, from the storage medium, the maximum number of pieces of valid data in order from a head of the plurality of pieces of data that are stored in the plurality of second logical addresses, respectively; and transfer the read maximum number of pieces of valid data to the host memory.

8. The storage drive according to claim 7, wherein a storage area of the host memory includes a first buffer storing the first information, a second buffer storing the first number of pieces of valid data, and a third buffer storing the second information, the write request further designates a first buffer address indicative of the first buffer, a second buffer address indicative of the second buffer, and a third buffer address indicative of the third buffer, and the controller is configured to:

transfer the first information from the first buffer based on the first buffer address;

transfer the first number of pieces of valid data from the second buffer based on the second buffer address; and transfer the second information from the third buffer based on the third buffer address.

9. The storage drive according to claim 8, wherein the second buffer includes the first number of storage areas storing the first number of pieces of valid data, respectively, i-th piece of valid data among the first number of pieces of valid data is data stored in an i-th logical address used by the host from a head of the plurality of logical addresses, i being an integer from one to the first number, and the controller is configured to transfer the first number of pieces of valid data from the first number of storage areas, respectively.

10. The storage drive according to claim 7, wherein a storage area of the host memory includes a first buffer capable of storing the fourth information, a second buffer capable of storing the maximum number of pieces of data, and a third buffer capable of storing the third information, the read request further designates a first buffer address indicative of the first buffer, a second buffer address indicative of the second buffer, and a third buffer address indicative of the third buffer, and the controller is further configured to:

transfer the fourth information to the first buffer based on the first buffer address;

transfer either the second number of pieces of valid data or the maximum number of pieces of valid data to the second buffer based on the second buffer address; and transfer the third information to the third buffer based on the third buffer address.

11. The storage drive according to claim 10, wherein the second buffer includes the maximum number of storage areas, and the controller is further configured to:

in a case where the second number of pieces of valid data is transferred to the second buffer, transfer the second number of pieces of valid data to the second number of storage areas from a head of the maximum number of storage areas, respectively; and in a case where the maximum number of pieces of valid data is transferred to the second buffer, transfer the maximum number of pieces of valid data to the maximum number of storage areas, respectively.

* * * * *